(12) United States Patent
Kemery et al.

(10) Patent No.: US 11,213,142 B2
(45) Date of Patent: Jan. 4, 2022

(54) MOBILE DEVICE STAND, STAND SYSTEM AND COMBINED CASE FOR MOBILE DEVICE

(71) Applicant: Alaska Airlines, Inc., Seattle, WA (US)

(72) Inventors: Mike Kemery, Seattle, WA (US); Kyle Allen Fuhrer, Maple Valley, WA (US); Naomi-Hannah Onajite Agbro, Seattle, WA (US); Jeffrey Ladwig, Seattle, WA (US); Zebrick B. Roach, Seattle, WA (US); John Dan Mabry, Jr., Seattle, WA (US)

(73) Assignee: Alaska Airlines, Inc., Seattle, WA (US)

( * ) Notice: Subject to any disclaimer, the term of this patent is extended or adjusted under 35 U.S.C. 154(b) by 0 days.

(21) Appl. No.: 16/537,372

(22) Filed: Aug. 9, 2019

(65) Prior Publication Data

US 2020/0046145 A1 Feb. 13, 2020

Related U.S. Application Data

(60) Provisional application No. 62/717,674, filed on Aug. 10, 2018, provisional application No. 62/750,750, filed on Oct. 25, 2018.

(51) Int. Cl.
| | | |
|---|---|---|
| *A47F 9/04* | (2006.01) | |
| *F16M 11/04* | (2006.01) | |
| *A45F 5/00* | (2006.01) | |
| *A45C 11/00* | (2006.01) | |
| *F16M 11/26* | (2006.01) | |
| *F16M 11/10* | (2006.01) | |
| *G06K 7/08* | (2006.01) | |
| *F16B 1/00* | (2006.01) | |

(52) U.S. Cl.
CPC ............ *A47F 9/04* (2013.01); *F16B 1/00* (2013.01); *F16M 11/041* (2013.01); *F16M 11/10* (2013.01); *F16M 11/26* (2013.01); *G06K 7/087* (2013.01); *A47F 2009/041* (2013.01); *F16B 2001/0035* (2013.01); *F16M 2200/027* (2013.01)

(58) Field of Classification Search
CPC ............ A47F 9/04; F16M 11/041; A45F 5/00
USPC ...................................................... 235/449
See application file for complete search history.

(56) References Cited

U.S. PATENT DOCUMENTS

2017/0277019 A1* 9/2017 Tachibana .............. F16M 13/00
2019/0346429 A1* 11/2019 Harris .................. G06K 9/6215

* cited by examiner

*Primary Examiner* — Toan C Ly
(74) *Attorney, Agent, or Firm* — Klarquist Sparkman, LLP

(57) ABSTRACT

A stand for positioning a mobile device comprises a quick attach mount configured to receive a mobile device and a height-adjustable upright member connected to support the quick attach mount and adjustable to position the quick attach mount within a desired height range for users.

8 Claims, 24 Drawing Sheets

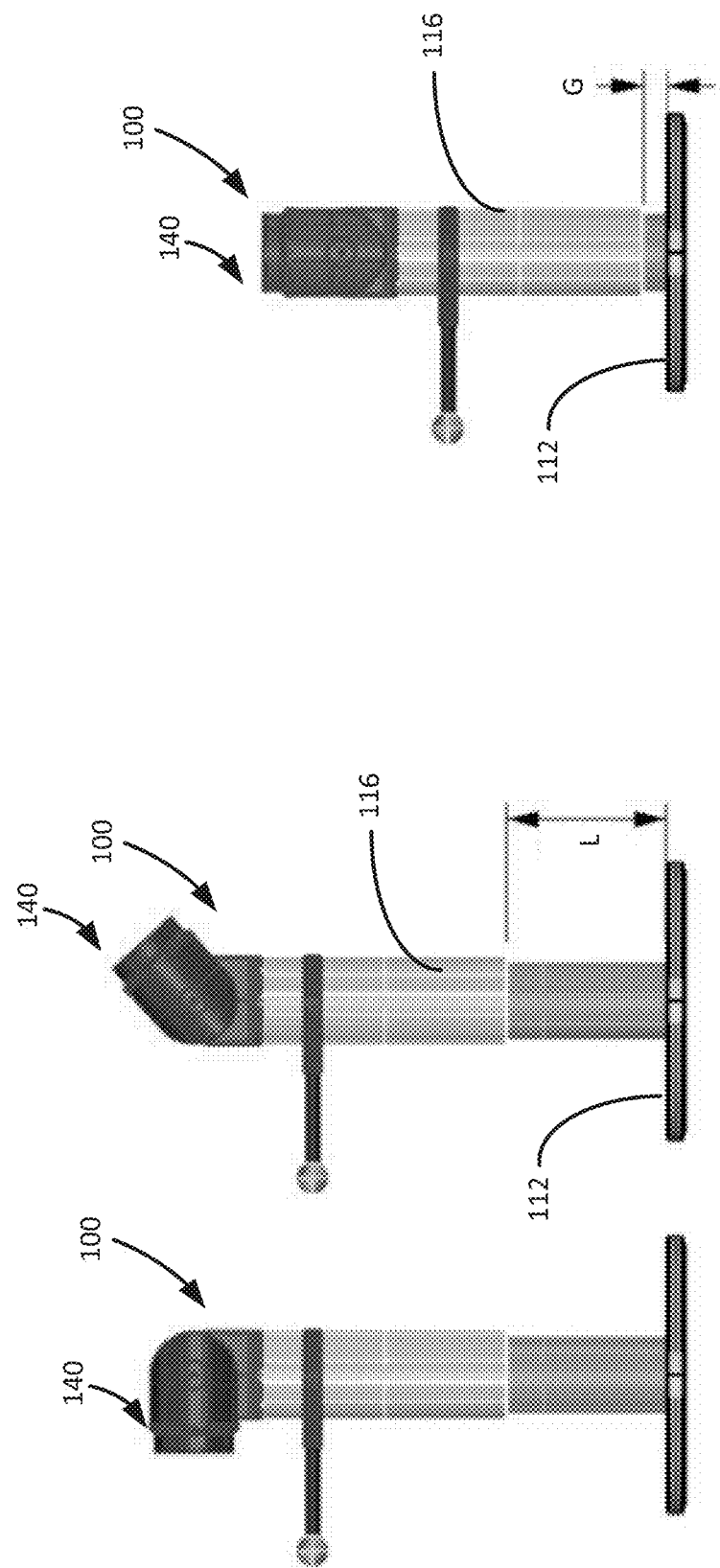

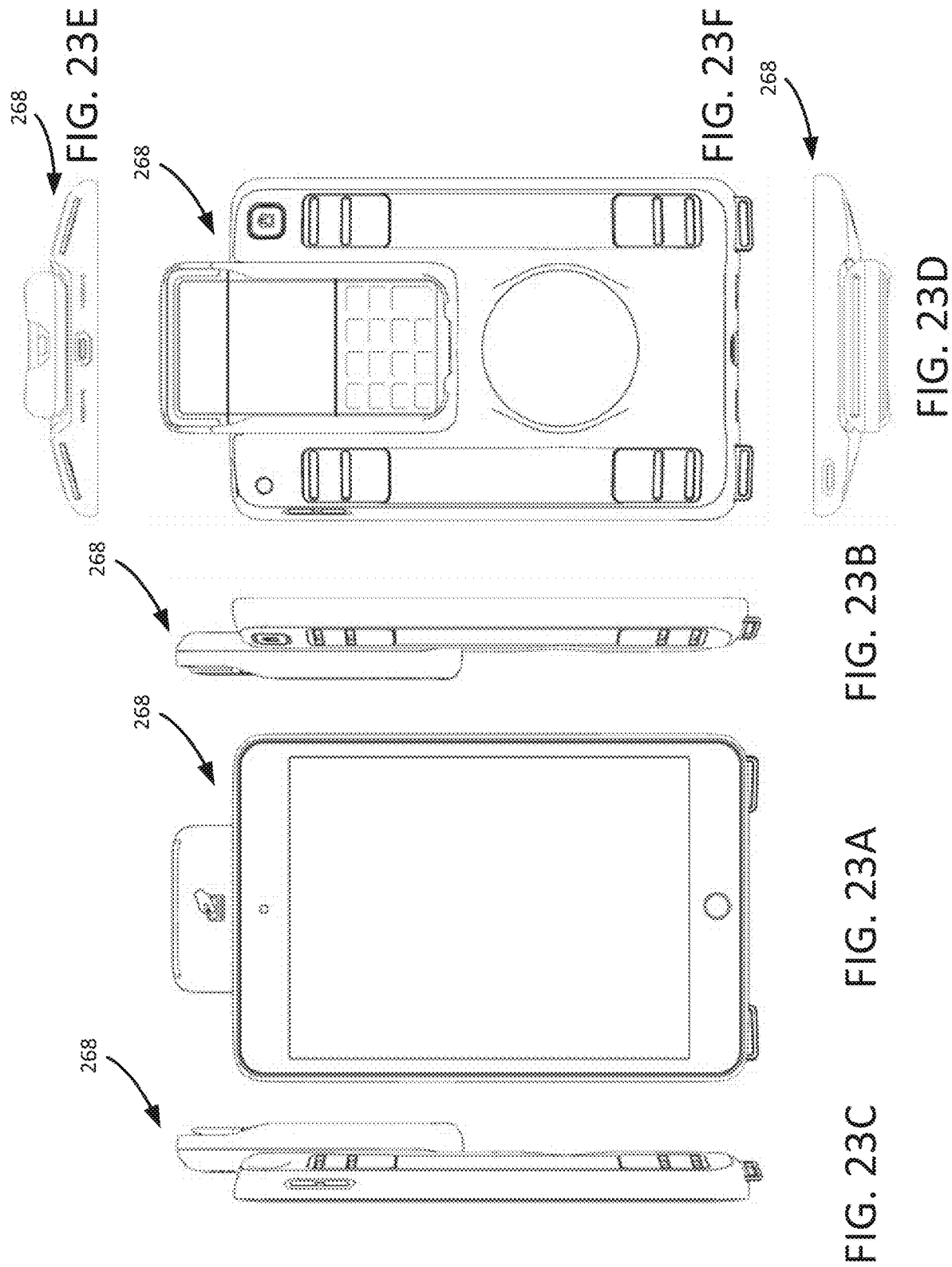

MOBILE DEVICE STAND, STAND SYSTEM AND COMBINED CASE FOR MOBILE DEVICE

CROSS REFERENCE TO RELATED APPLICATION

This application claims the benefit of U.S. Provisional Patent Application No. 62/717,674, filed Aug. 10, 2018, and U.S. Provisional Patent Application No. 62/750,750, filed Oct. 25, 2018, both of which are hereby incorporated by reference.

BACKGROUND

This application relates to positioning a mobile device for use, such as with a device that holds the mobile device in a desired position for easy and accurate use.

As mobile devices become more widely used for dedicated tasks, there can be a need for a stand, holder or other device to selectively position a mobile device in space relative to one or more users and other related objects. Mobile devices include smartphones, tablet computers, e-readers, handheld computers and other handheld devices having a display, as well as related special purpose devices (e.g., scanners, credit card readers, etc.), whether used on their own or in conjunction with general purpose mobile devices.

A user seeking to interact with a mobile device may need to view its display screen and/or to enter information, including by way of a touchscreen and/or other controls. In some cases, users may need to hear audio information from the mobile device. In still other cases, users interact with a different mobile device function, such as for imaging or scanning of an item presented by a user. In some situations, users may be encumbered and have only one hand with which to interact with the mobile device, so maintaining the mobile device in position while a user uses its touchscreen helps improve accuracy and reduce the required time for use.

In some cases, use of the mobile device alternates between two or more classes of users, so the device may need to be repositioned for each use, such as between two users who are facing each other. Also, various lighting conditions and user vision/mobility needs may be encountered, so the ability to adjust the viewing angle or otherwise reconfigure the mobile device quickly, preferably while it remains within the stand, is desirable.

In some cases, a separate digital device, such as a point of sale device, must frequently be used in connection with the mobile device, which currently necessitates managing a second, separate device, which is inconvenient and requires more time to use in processes.

It would also be desirable to provide a mobile device stand that is portable so it can be easily stored and then deployed for use at another location. It would also be helpful to allow for easily detaching the mobile device, such as to remove it when a task is completed or to allow for increased flexibility in positioning the mobile device in certain situations.

Overall, currently available stands, cases and similar devices fail to fulfill all of the desired needs in attaching and positioning a mobile device.

SUMMARY

Described below are embodiments of a stand and stand system that address shortcomings of conventional devices for positioning a mobile device.

According to one implementation, a stand for positioning a mobile device includes a quick attach mount configured to receive a mobile device and a height-adjustable upright member connected to support the quick attach mount and adjustable to position the quick attach mount within a desired height range for users.

The height-adjustable upright member can comprise a pivot joint coupled to the quick attach mount. The pivot joint allows an angle of the quick attach mount relative to the upright member to be adjusted.

The quick attach mount can include magnet members. The magnet members in the quick attach mount can include first magnet members having a first magnetic strength and second magnet members having a second magnetic strength, and wherein the first and second magnet members are positioned alternatingly in the quick attach mount.

The height-adjustable upright member can comprise an inner member and an outer member that are friction fit to each other. At least one of the inner member or the outer member can comprise a foam surface configured to increase friction.

The stand can comprise a lateral member coupled to the upright member and an imaging target coupled to the lateral member.

According to another implementation, a stand for positioning a mobile device comprises a mount configured to receive a mobile device, a height-adjustable upright member coupled to the mount and adjustable to position the mount within a desired height range for users; and an imaging target coupled to the stand and positionable within an imaging range of a mobile device received in the mount.

The imaging target can be supported by a lateral member coupled to the upright member. The lateral member can be resilient and configured to move upon contact with an article positioned for imaging. The imaging target can comprise a substantially spherical shape. The lateral member can comprise an adjustable lateral member coupler configured to couple the lateral member to the upright member.

The stand can be configured to be swivelable about a vertical axis.

According to another implementation, a stand system comprises a stand for positioning a mobile device at a desired height and a carrier. The stand comprises an upright member and a first quick attach mount at an upper end of the upright member. The carrier is dimensioned to receive at least a portion of the mobile device, the carrier having a side fitted with a second quick attach mount. The second quick attach mount on the carrier is coupleable with the first quick attach mount on the stand to position the carrier at a desired position for a user.

The carrier can be dimensioned to receive at least a portion of a tablet computer.

The carrier can comprise an external hand grip to facilitate holding the carrier with one hand.

The first and second quick attach mounts comprise magnet members configured to provide a magnetic force for mounting the carrier to the stand. The magnet members can be configured to align the second quick attach mount relative to the first quick attach mount so that the carrier is in a selected position and orientation when coupled to the stand.

The stand system can comprise an imaging target coupled to the stand and positionable within an imaging range for a mobile device in the carrier. The imaging target can be mounted to the upright member by a resilient arm.

A case for a mobile device for use in coupling with a stand can comprise a case shaped to accommodate the mobile device and having a mounting area and magnet members arranged in the mounting area for coupling the case to a stand by magnetic attraction. The case can comprise a channel and a release member for coupling a digital device in a case frame to the channel.

The foregoing and other objects, features, and advantages will become more apparent from the following detailed description, which proceeds with reference to the accompanying figures.

BRIEF DESCRIPTION OF THE DRAWINGS

FIGS. 4A, 4B and 4C are side elevation views of the stand showing the mount in different positions and showing the stand at different heights.

FIGS. 23A-23F are front elevation, left side elevation, right side elevation, top plan, bottom plan and rear elevation views of the case of FIG. 11.

DETAILED DESCRIPTION

Described below are embodiments of a stand for a mobile device, as well as a stand system that includes a stand and a carrier (case) for the mobile device that is coupleable to the stand, for positioning the mobile device as desired.

Figure 1:
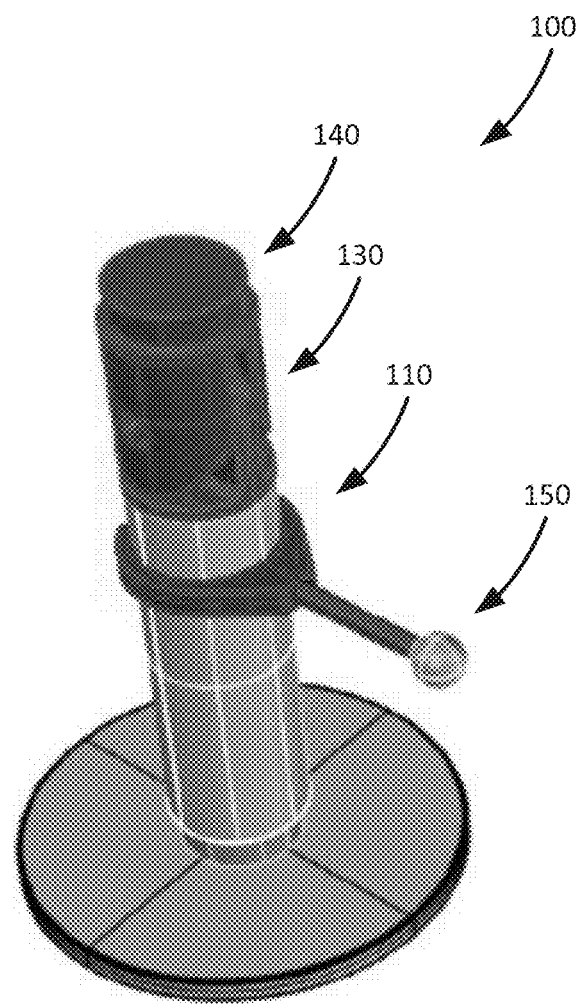
FIG. 1 is a perspective view of a stand for a mobile device.
Figure 2:
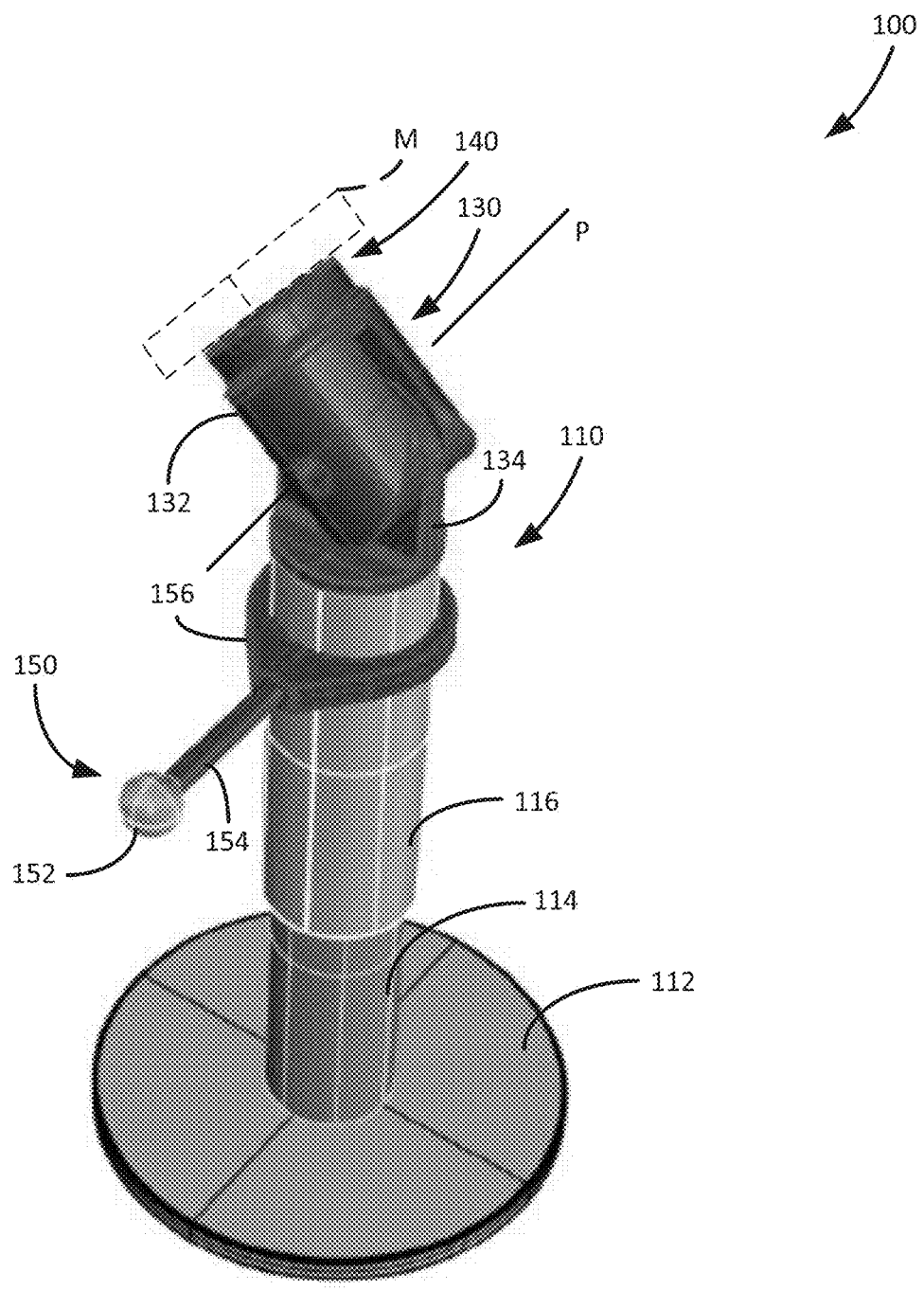
FIG. 2 is another perspective view of the stand of FIG. 1 shown from a different angle and with a mobile device shown mounted to the stand.
Figure 6:
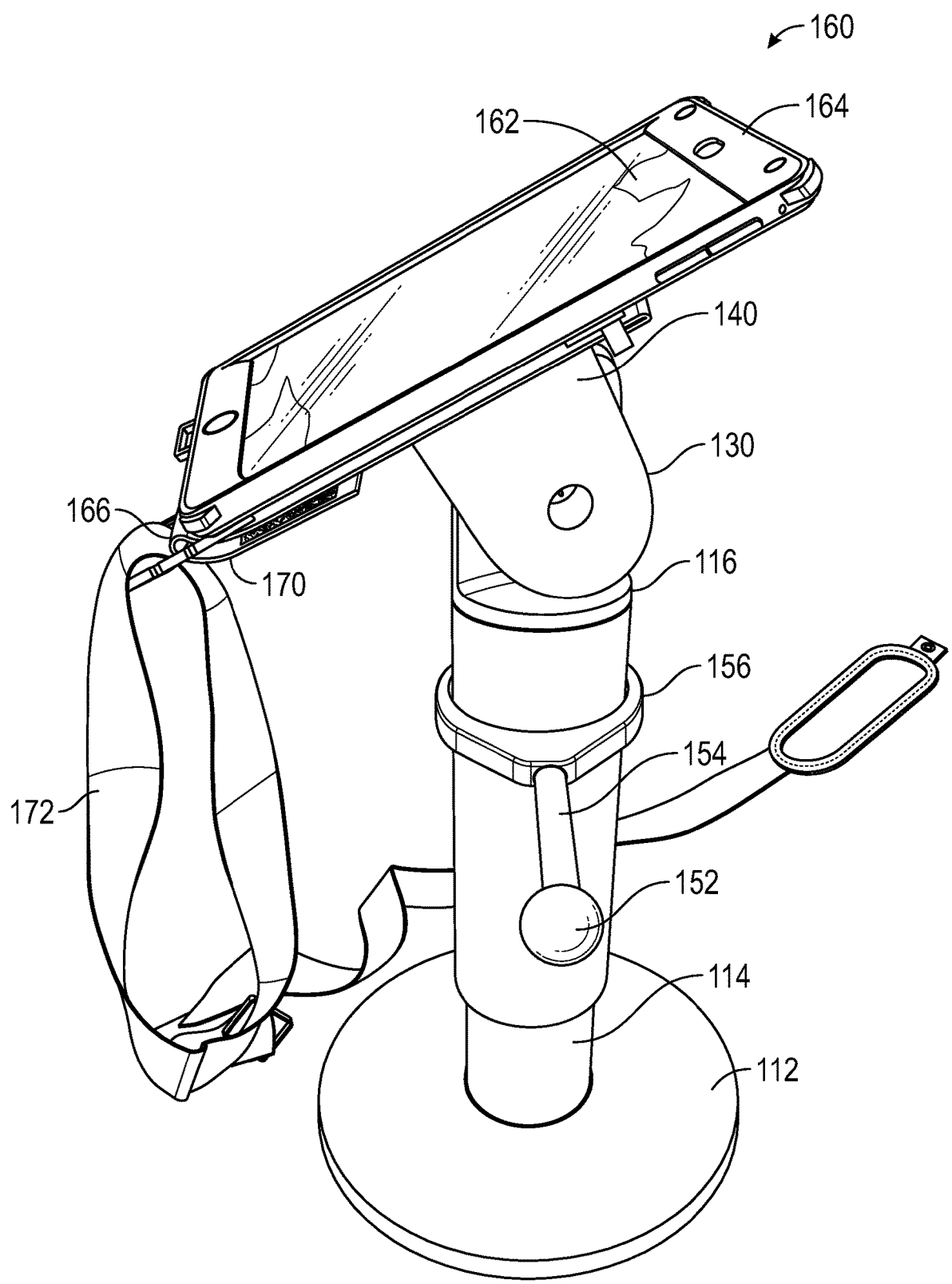
FIG. 6 is a perspective view of a stand system for a mobile device, also showing a carrier for and mobile device coupled to the stand.

FIG. 1 is a perspective view of a representative implementation of a stand 100 that includes an upright member 110, and optional pivot joint 130 and a quick attach mount 140 coupleable to a mobile device (as shown, e.g., in FIG. 2 and FIG. 6). The stand 100 can also be provided with an optional imaging target 150. In general, the stand 100 provides for positioning the mobile device (e.g., in its bare state, in a case or in a case received in a carrier) at desired heights (and, optionally, angles) for efficient use by users of different heights and/or seeking to use the mobile device for different functions (e.g., consulting the display screen of the mobile device for reference, inputting information on the mobile device and/or using the mobile device for imaging).

FIG. 2 is another perspective view of the stand 100, and also showing a mobile device M (depicted schematically) coupled to the quick attach mount 140. As shown in FIG. 2, the upright member 110 can be configured as a height-adjustable upright member having multiple components such as, e.g., an inner member 114 and an outer member 116. As can be seen in FIG. 2, the upright member 110 has been elevated from the position shown in FIG. 1 by raising the outer member 116 relative to the inner member 114. The inner member 114 extends from a base 112, which is intended to be positioned on a floor, the ground or other generally level surface.

As also shown in FIG. 2, the pivot joint 130 can be pivoted in a vertical plane about the pivot axis P (which extends horizontally) to position the quick attach mount 140 at a desired angle relative to the upright member 110. The pivot joint 130 may be pivoted to the position as shown to provide easier access to the screen display of the mobile device M and/or to position the mobile device M for satisfactory imaging, as described in greater detail below. If desired, the stand 100 can also be configured to allow the mobile device M to pivot laterally (or swivel) about a vertical axis.

The pivot joint 130 includes a pivot head 132 and the pivot end 134 that are pivotably connected to each other at the pivot axis P. The pivot end 134 is fitted to an upper end of the upright member 110. Specifically, the pivot end 134 in the illustrated implementation is fitted into an end of the outer member 116. The pivot head 132 defines or is coupled to the quick attach mount 140. The pivot head 132 and the pivot end 134 can be made from aluminum or another suitable material.

The imaging target 150 includes a target element 152 positionable in space relative to the mobile device M coupled to the mount 140, and within an imaging range of the mobile device's imaging capability (also referred to herein as an imaging device). In the illustrated implementation, the target element 152 is generally spherical, but other shapes could also be used. The imaging target 150 is preferably coupled to the upright 110 to provide a convenient structure by which to position the target element 152 in space. The imaging target 150 can include a lateral member 154 connecting the target element 152 to a lateral member coupler 156 that is coupleable with the upright 110. Preferably, the lateral member coupler is coupleable to the movable part of the upright member 110 so that the target element 152 remains in the same position relative to the mount 140 if the height of the stand 100 is raised or lowered. The lateral member coupler 156 can be made of nylon or another suitable material.

The imaging target 150 can serve as a target for setting up the mobile device M for proper imaging (including, for example, scanning and/or photographing). The imaging target 150 can be used to check or to set a focus point for an imaging operation conducted with the mobile device (specifically, with its imaging device or camera). In addition, the imaging target 150 can be set as a target for presenting an item to be scanned, e.g., a barcode or other scanning subject on a screen or on another medium (e.g., paper or other physical medium). In one example, a passenger with a boarding pass displayed on her mobile phone, her watch or on paper is guided to touch the target element 152 with the boarding pass, thereby ensuring that the boarding pass is presented in an appropriate position for accurate scanning. The target element 152 can have a distinctive shape and/or color so that users are directed to use it, even intuitively. For example, in some embodiments, the target element 152 is a lightly colored or white sphere, whereas the other components of the stand have a predominately matte black appearance.

In the illustrated implementation, the lateral member 154 that supports the target element 152 is configured to be resilient so that the target element 152 returns to its original position after it is contacted, such as when a passenger contacts the target element 152 with her boarding pass. For example, the lateral member 154 can be a coil spring, or include a spring or other resilient member.

Figure 3A:
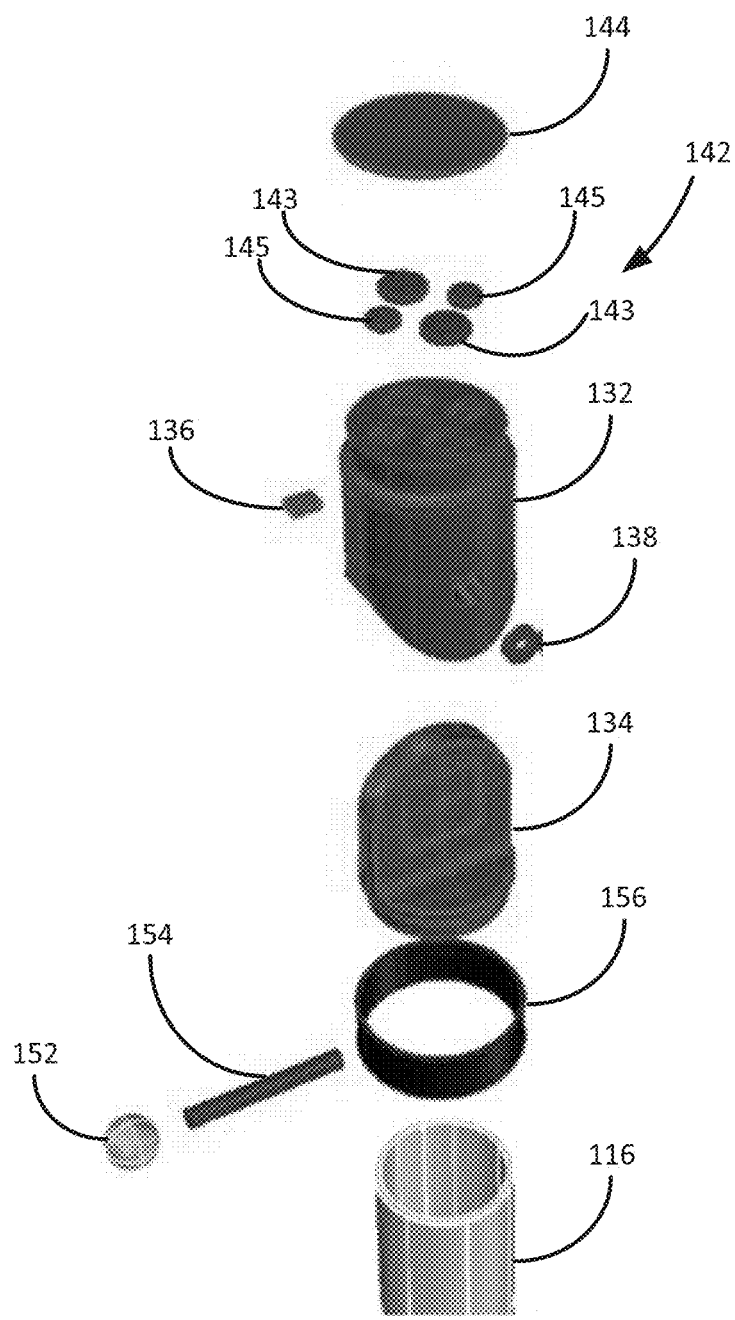
FIGS. 3A and 3B are exploded perspective views showing components of the stand.
Figure 3B:
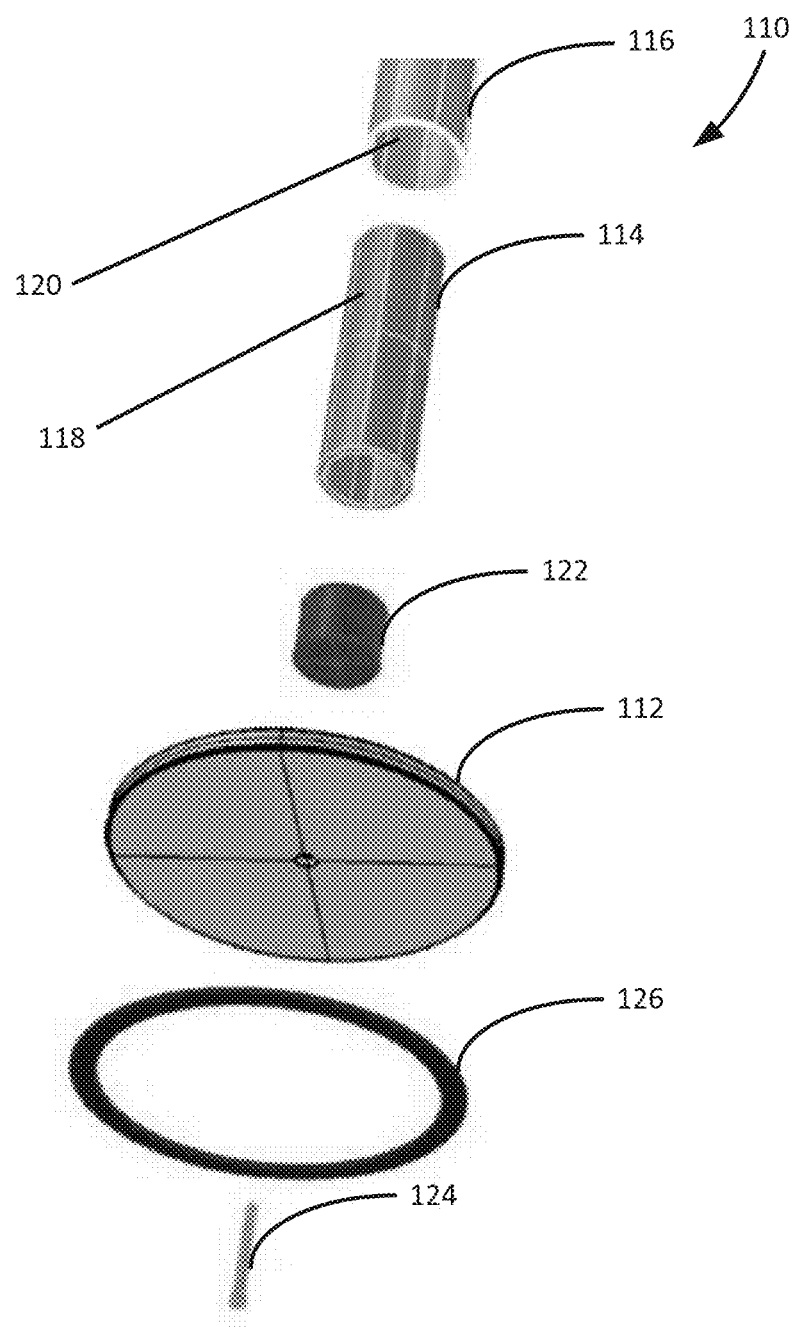

An exploded perspective view of the stand 100 is shown in FIGS. 3A and 3B. In the illustrated implementation, the quick attach mount 140 is positioned at an end surface of the pivot connection 130. Specifically, the quick attach mount 140 in a specific implementation can include magnet members 142 positioned at the end surface of the pivot head 132. Optionally, the end surface with the magnet members 142 can be covered with a cover 144. The cover 144 can be formed of rubber or another suitable material.

The magnet members 142 can include first magnet members 143 and second magnet members 145. The first magnet members 143 can have a higher strength, and the second magnet members can have a lower strength 145. In some implementations, the mobile device or its carrier is fitted with corresponding magnet members of differing strength in a complementary pattern such that the mobile device is urged into a selected position and orientation (e.g., the landscape orientation or the portrait position) when positioned close to the quick attach mount 140.

The pivot head 132 is connected to the pivot end 134 at a pivot connection 136 that includes a pivot element (not shown) and washers 138. As also shown, there is an optional bumper 136 that is provided to reduce noise from the pivot head 132 contacting the pivot end 134 when the pivot head is rotated to either end of the pivoting range.

The pivot end 134 is coupled to the upright member 110. In the illustrated implementation, the pivot cap is shaped to be inserted into an end of the outer member 116.

Figure 5:
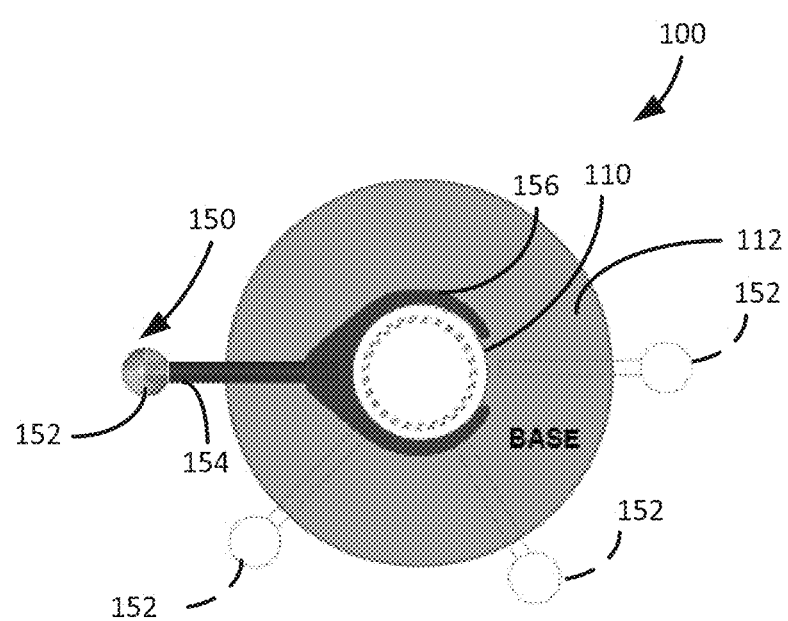
FIG. 5 is a plan view showing an imaging target in several possible positions relative to an upright member and base of the stand.

The lateral member coupler 156 is dimensioned to be adjustably positionable around the outer member 116, and may have an enclosed configuration as shown in FIG. 3A or an open configuration as shown in FIG. 5. The lateral member 154 is coupled to the lateral member coupler 156 and configured to extend laterally, e.g., horizontally, relative to the upright member 110.

Referring to FIG. 3B, the outer member 116 is configured to slide relative to the inner member 114. In some implementations, a portion of an outer surface 118 of the inner member 114, a portion of the inner surface 120 of the outer member 116 or both are configured to have a friction fit with each other such that a selected minimum force is required to change a height of the upright member 110. For example, portions of the inner surface 118 or 120 can be coated with a foam that increases friction between the inner member 114 and outer member 116. A suitable foam is an open cell urethane foam having a soft durometer. Optionally, the foam can have an exterior skin. The inner and outer members 114, 116 can be configured for infinite positioning or indexed positioning within low and high limits relative to each other. The inner and outer members 114, 116 can be tubes constructed of ABS tubes or have another configuration.

As described above, the upright member 110 is preferably attached to a base, such as a base 112 as shown. The base plate 112 can have a selected weight (e.g., approximately two pounds) tending to offset the weights of the other components and the mobile device. In some embodiments, the base plate 112 is formed of aluminum, steel or other suitable materials. In the illustrated implementation, a lower end of the upright member 110 is inserted over a support 122 and secured to the base 112, e.g., using a threaded fastener 124. In one implementation, the support 122 is formed of aluminum. A lower surface of the base 112 can be provided with an optional protection ring 126, e.g., made of rubber or another resilient material, to prevent floors and other surfaces from being scratched by the stand.

FIGS. 4A, 4B and 4C are side elevation views of the stand 100 showing the mount 140 in different positions and showing the stand 100 at different heights. In FIG. 4A, the mount 140 is shown positioned in a fully pivoted position so that a mobile device coupled to the mount 140 would be in a substantially vertical position. In FIG. 4B, the mount 140 is pivoted to a position inclined with respect to the vertical axis, and the stand 110 is positioned at a maximum height for the illustrated embodiment, which is a distance L (e.g., approximately 5 inches) above the base plate 112. In FIG. 4C, the stand 110 has a been lowered to a minimum height, which is positioned at a distance G (e.g., approximately 0.5 inch) above the base plate 112 to prevent the outer member 116 from contacting the base plate 112.

FIG. 5 is a plan view of the stand 100 showing how the imaging target 150, and specifically, the target element 152, can be positioned at various different positions (shown as dashed outlines) about the upright member 110 by repositioning the lateral member coupler 156 and the lateral member 154.

FIG. 6 is a perspective view of the stand 100 implemented as part of a stand system 160, showing a mobile device 162 coupled to the quick attach mount 140. Specifically, the mobile device 162, which is shown received in a close-fitting mobile device case 164, is coupled to a mobile device carrier 166, which is in turn coupled to the quick attach mount 140. The carrier 166 and the mobile device case 164 can be separate components, or the carrier can be formed to include the mobile device case.

In the case of the quick attach mount 140 that uses magnet members 142, the carrier 166 can include corresponding magnet members that cooperate with the magnet members 142 so that the carrier 166 (and the mobile device coupled to the carrier 166) is magnetically coupled to the quick attach mount 140. As described above, the magnet members 142 and/or the corresponding magnet members can be arranged to assist in guiding the carrier 166 to be mounted in a specific orientation relative to the quick attach mount 140, e.g., so that the mobile device is in a portrait, or landscape or other desired orientation.

The carrier 166 assists a user in holding the mobile device 162, e.g., while the mobile device 162 is used for other purposes. For example, the carrier 166 may have one or more hand loops 170 made of elastic or inelastic material and shaped to receive either hand of a user to allow holding the mobile device without requiring two hands. The carrier 166 may also include a strap 172 around the user's neck and/or waist to allow carrying the mobile device and carrier 166 without requiring the user's hands.

Figure 7:
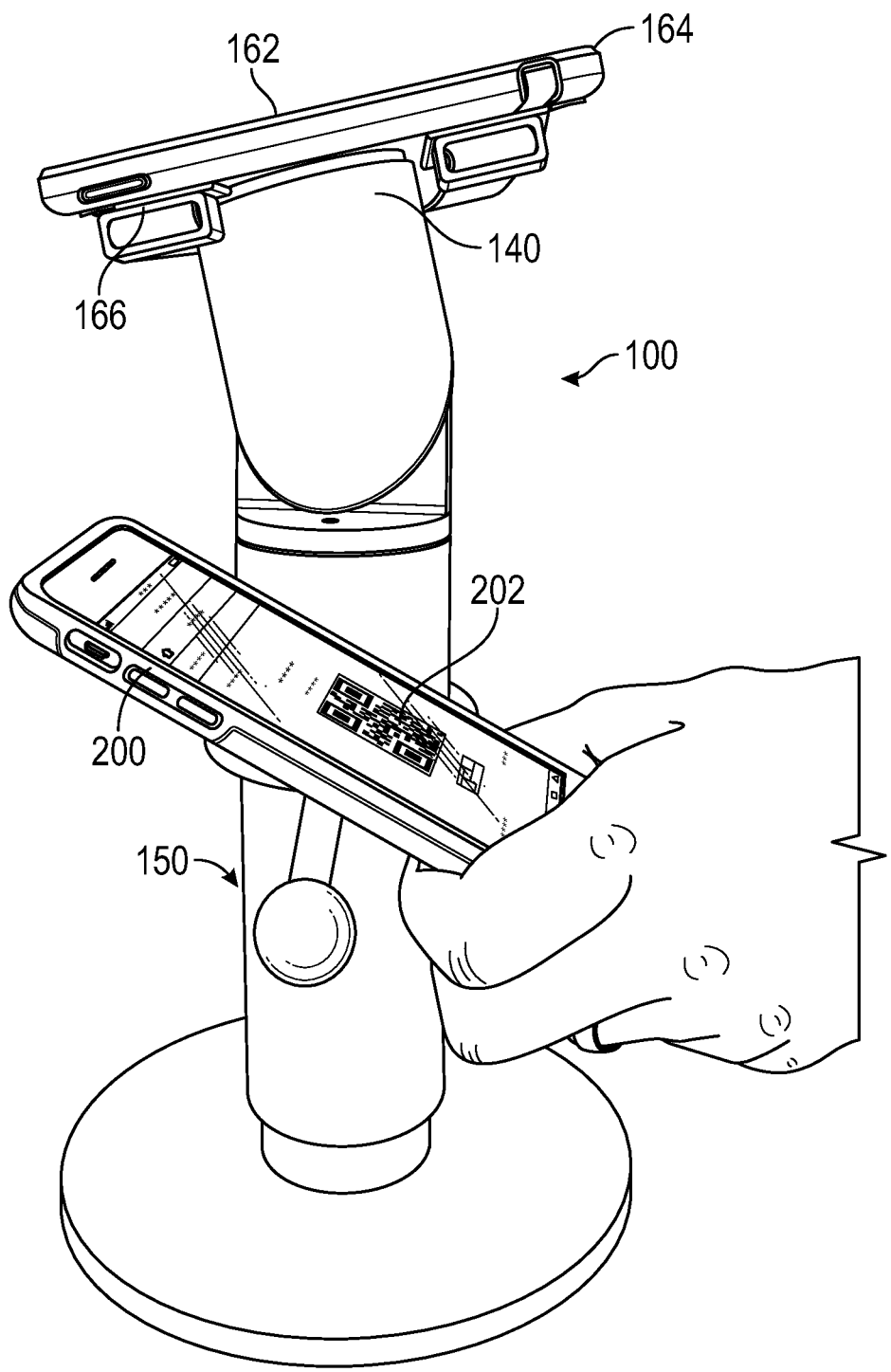
FIGS. 7, 8 and 9 are additional perspective views showing the stand with a mobile device and carrier coupled to the stand, and a user presenting a boarding pass on another mobile device for scanning.
Figure 8:
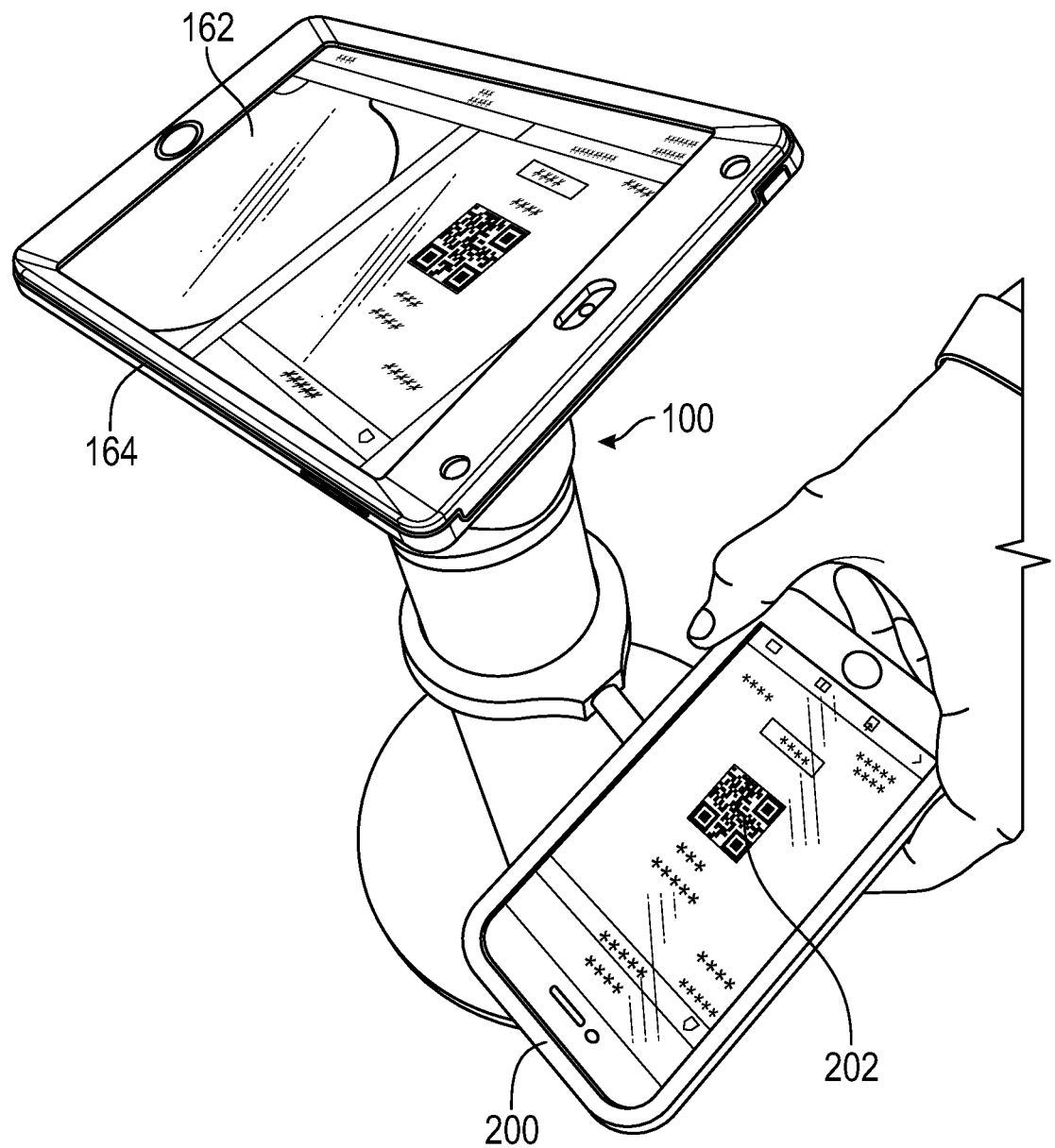
Figure 9:
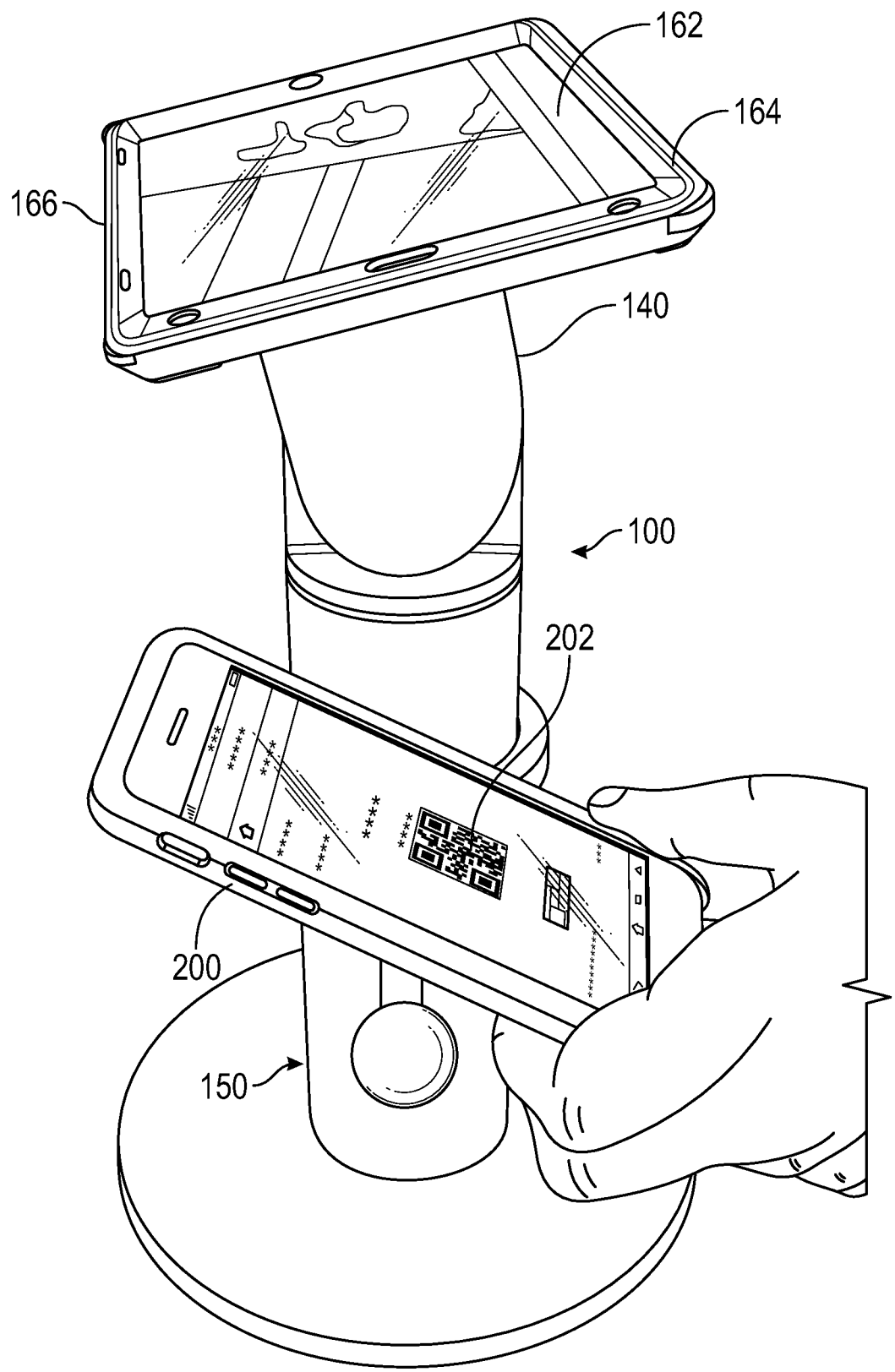

FIGS. 7, 8 and 9 are additional views of the stand 100, showing the mobile device 162 in its case 164 and the carrier 166 coupled to the quick attach mount 140. As also shown, a user such as a traveler is using a second mobile device 200 to display an image for scanning, such as a boarding pass 202. In FIG. 7, the user is approaching the imaging target 150 that defines an appropriate imaging range. In FIG. 8, an image of the boarding pass 202 as seen from the imaging device of the mobile device 162 is displayed on the mobile device 162, which allows, e.g., the user or an operator to verify that the boarding pass has been properly scanned. FIG. 9 is another view showing how the imaging target 150 guides the user to move the mobile device 200 into position for proper scanning.

Figure 10:
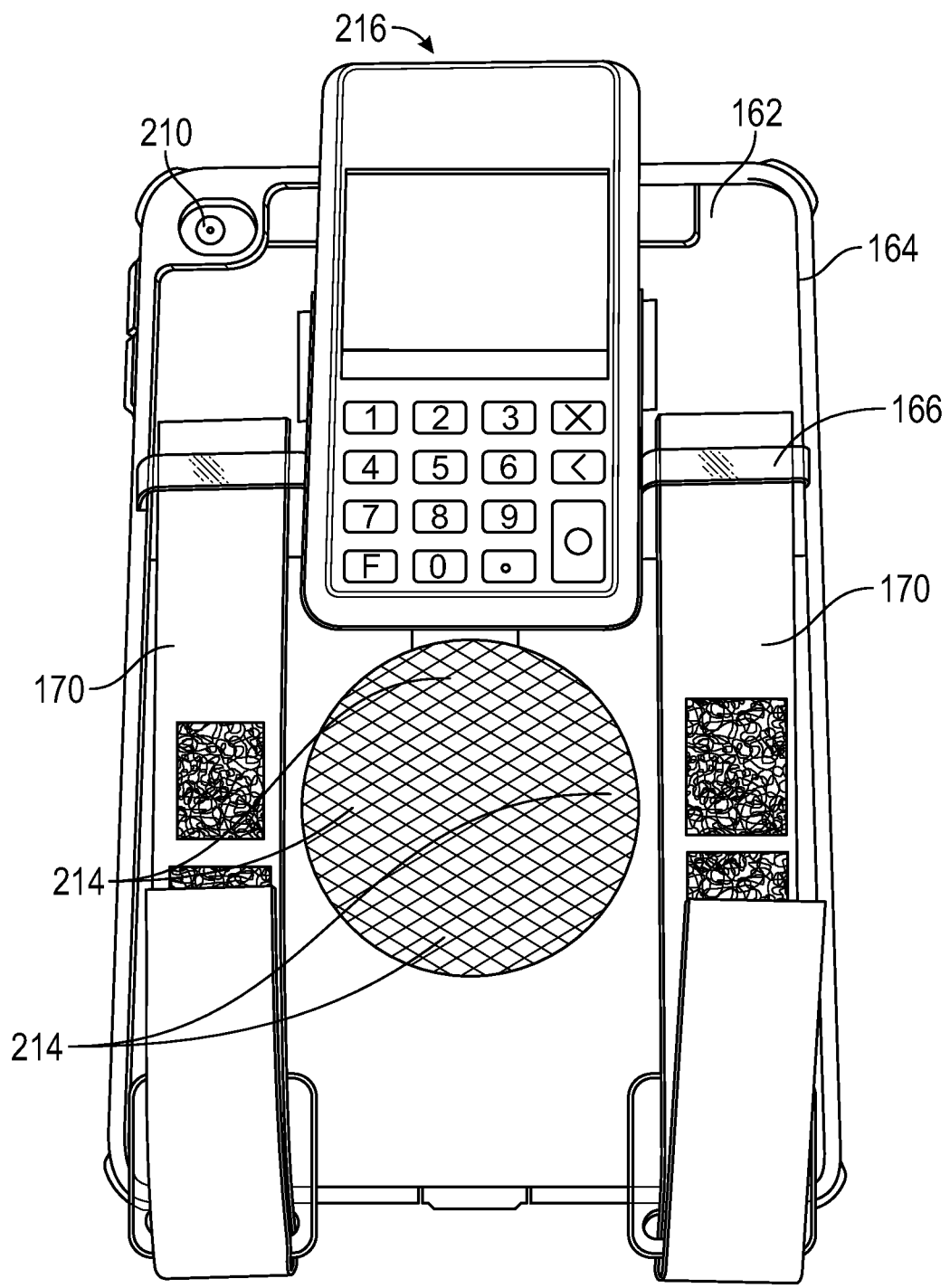
FIG. 10 is a plan view of the carrier and rear side of the mobile device, and also showing an additional digital device mounted to the carrier.

FIG. 10 is a plan view of the carrier 166 and showing a rear side of the mobile device 162 and its case 164. In the illustrated implementation, the carrier 166 is formed of a clear plastic. The carrier 166 can be formed as one piece or as an assembly of multiple pieces, and can include a case portion that closely fits around the mobile device 162. As shown, the carrier has one or more of the hand loops 170, such as two hand loops 170 as shown, to allow a user to use either hand to hold the carrier. Magnet members 214 can be arranged in a pattern to complement the magnet members 142 so that the mobile device 162 is held in a proper position relative to the quick attach mount 140 and, if desired, a proper orientation as well (e.g., the portrait orientation as shown in FIG. 6 or the landscape orientation as shown in FIGS. 7-9). The carrier 166 is designed to allow full use of the mobile device's imaging device 210.

As also shown, the carrier 166 can be designed to integrate other devices, such as another digital device 216 as shown, together with the mobile device 162. Thus, the carrier 166 serves to assist the user in handling the mobile device 162, which in the case of a tablet computer is often difficult to handle with one hand, and to use the mobile device 162 for different functions and in different environments. For example, the digital device 216 can be a credit card reader or other type of device, usually having at least some functions linked with those of the mobile device. The carrier 166 is designed to securely hold the digital device 216 and to position it for efficient use, such as projecting slightly beyond a forward edge of the mobile device as shown. In this way, the user can orient the digital device 216 for proper use, and in some cases, may be able to view an indicator that indicates whether the device is operating.

FIGS. 11-23D show another implementation in which a combined case 268 is configured to fit over the mobile device 162, and serves as a carrier for the digital device 216. Similar to the description above, the case 268 can be used with a stand, such as the stand 100, or the user may carry the case 268 by hand or wear the case 268 with a neck, waist or shoulder strap.

In the illustrated implementation, the case 268 is configured to fit directly over the mobile device 162, and thus no close-fitting mobile device case 164 is present. (In other implementations, however, it would be possible to configure the case 268 for use over the mobile device case 164.) The case 268 is designed in an effort not to reduce the viewing area of the mobile device 162. Thus, the case 268 is compatible with using a screen protective film on the display screen of the mobile device 162 of the type that covers the viewing area or of the type that extends over the entire front surface and at least part of the edges of the mobile device 162.

Figure 11:
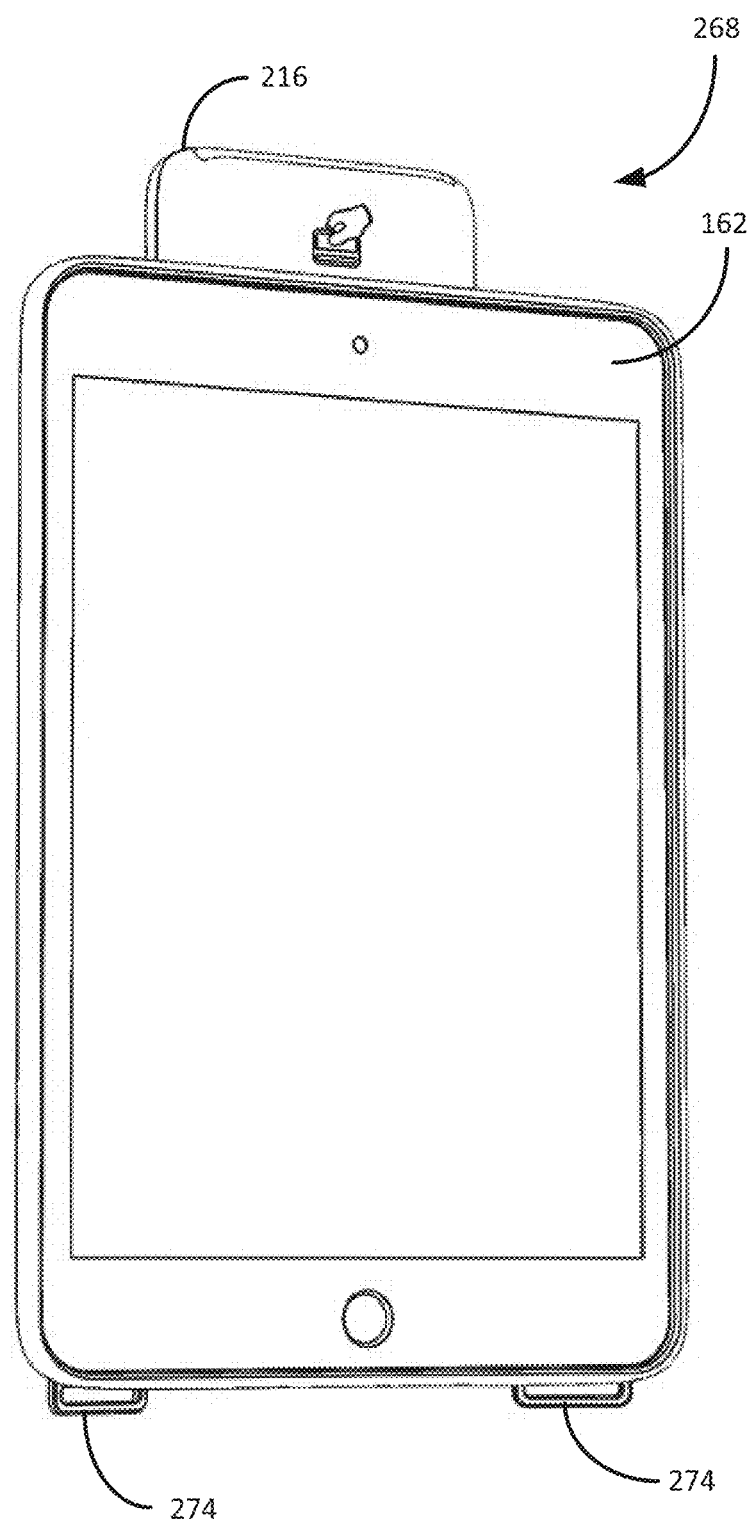
FIG. 11 is a front perspective view of a combined case for housing a mobile device and for use with the stand according to another implementation.
Figure 12:
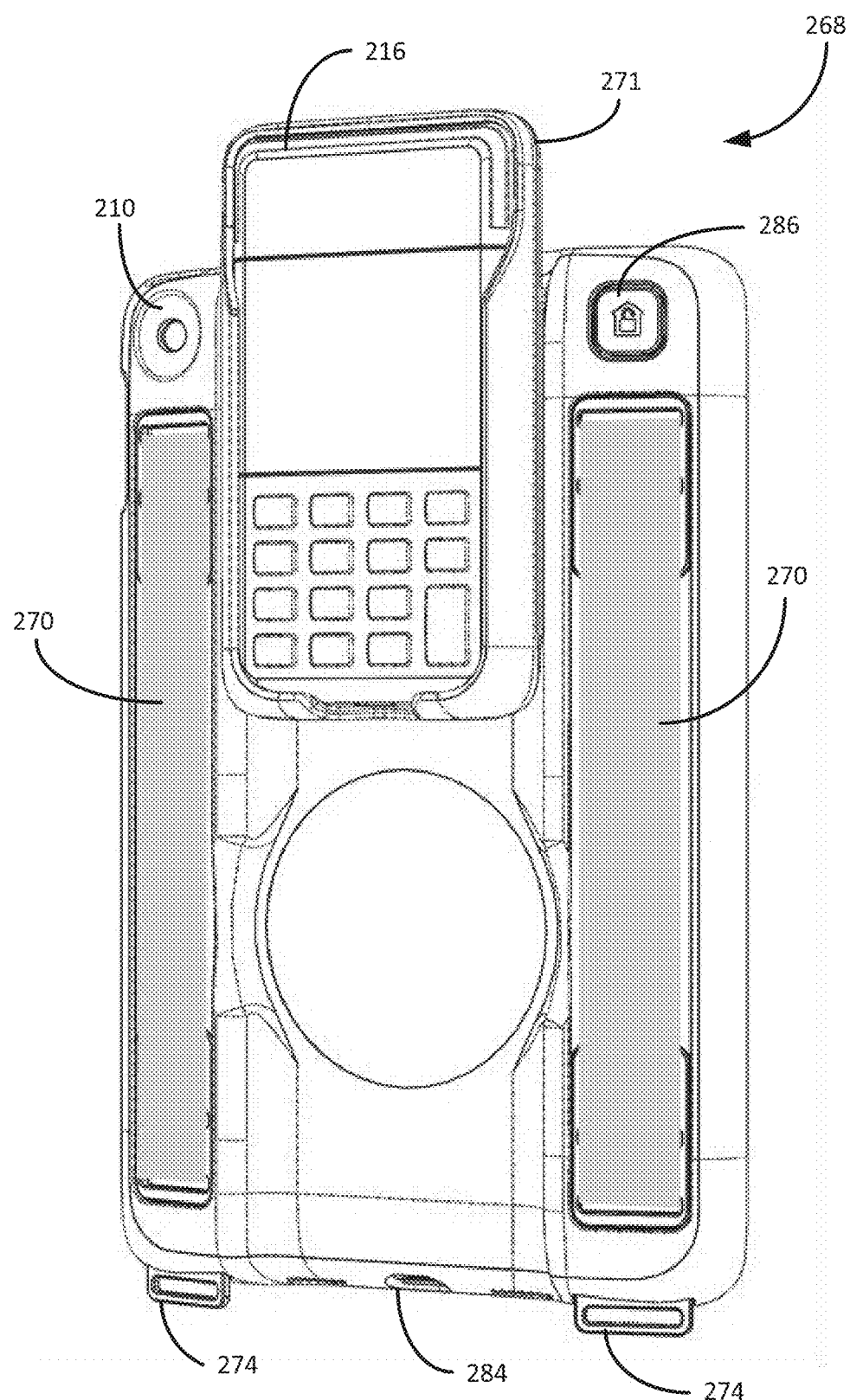
FIG. 12 is a rear perspective view of the case of FIG. 11.
Figure 13:
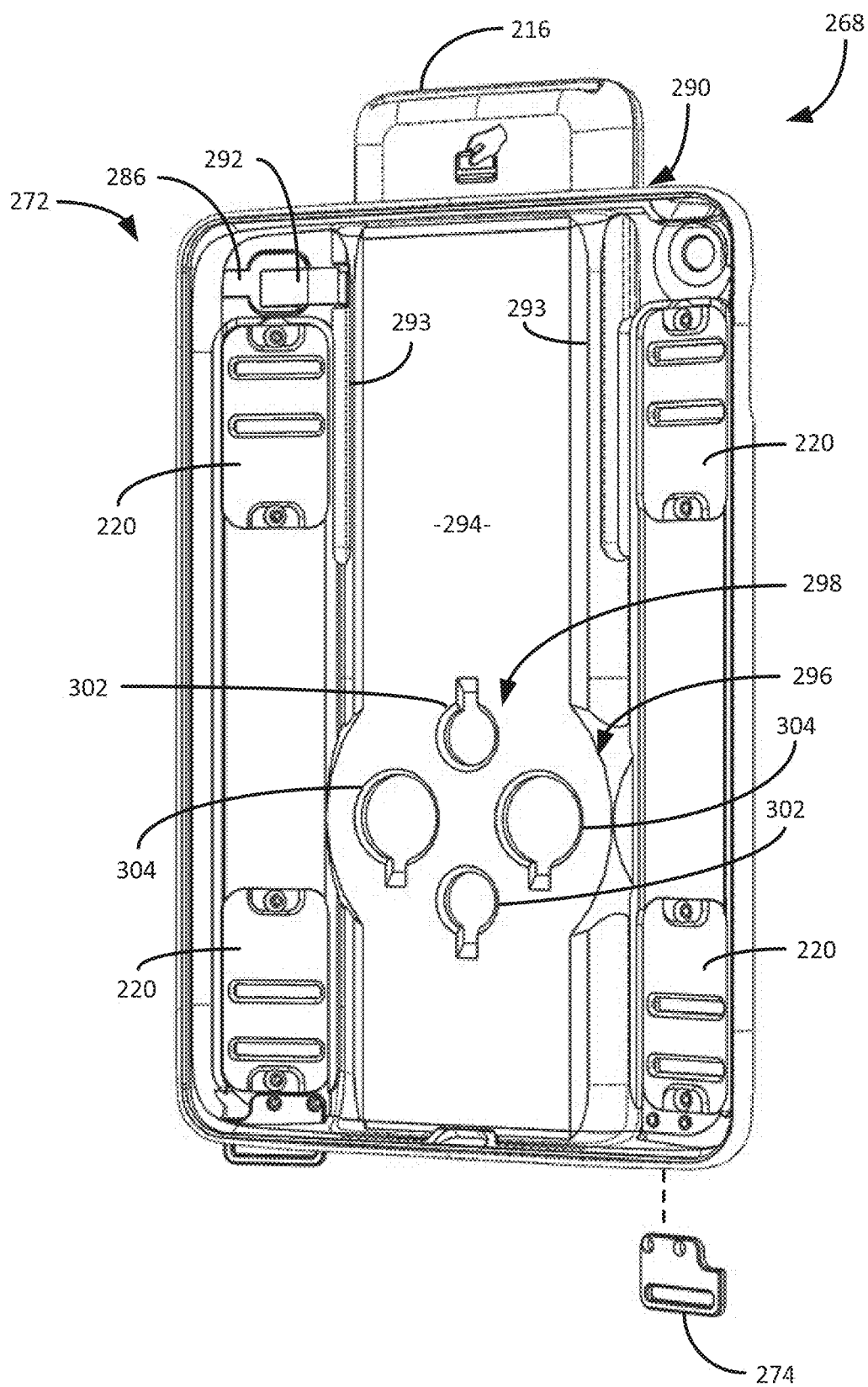
FIG. 13 is a front perspective view similar to FIG. 11 with the mobile device removed.
Figure 17:
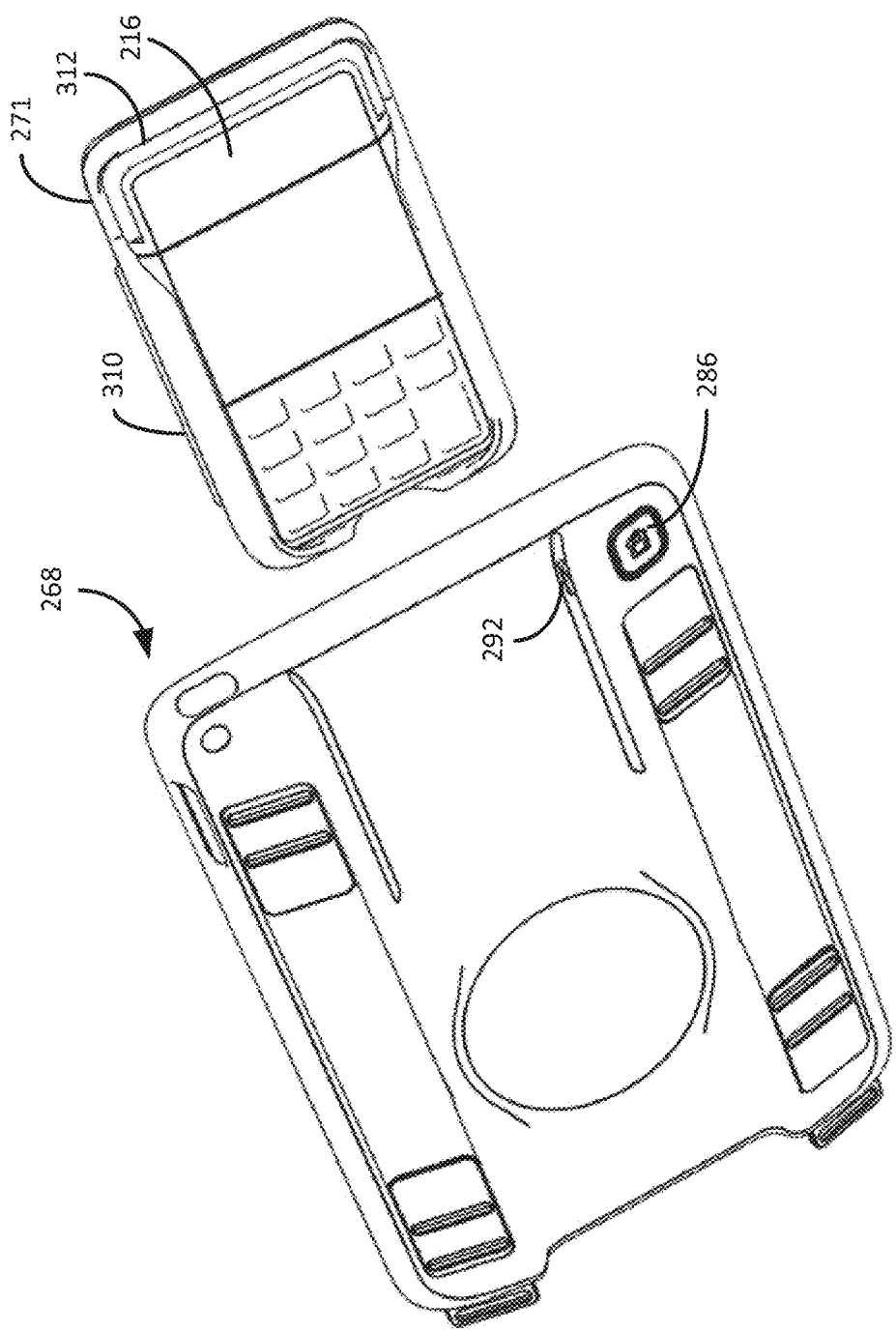
FIG. 17 is a perspective view of the case showing the digital device being uncoupled and removed.

As shown in FIGS. 11 and 12, the digital device 216 is coupled to the case 268. In the illustrated implementation, the digital device 216 is housed in a case frame 271 (see also FIG. 14 and FIG. 18), which is in turn coupled to the case 268. Preferably, the case frame 271/digital device 216 are removably coupled to the case 268, such as with a release assembly 272. Referring to FIG. 12, the case frame 271 can be released from its coupled position by depressing a release button 286, which can be positioned on a rear surface of the case 268 as shown. Referring to FIG. 13, which shows an interior 290 of the case 268 with the mobile device 162 removed, depressing the release button 286 operates a latch 292 that is normally positioned to retain the case frame 271 in a pair of opposing grooves 293 situated in a channel 280. FIG. 17 shows the digital device 216/case frame 271 following their release from the case 268.

Figure 18:
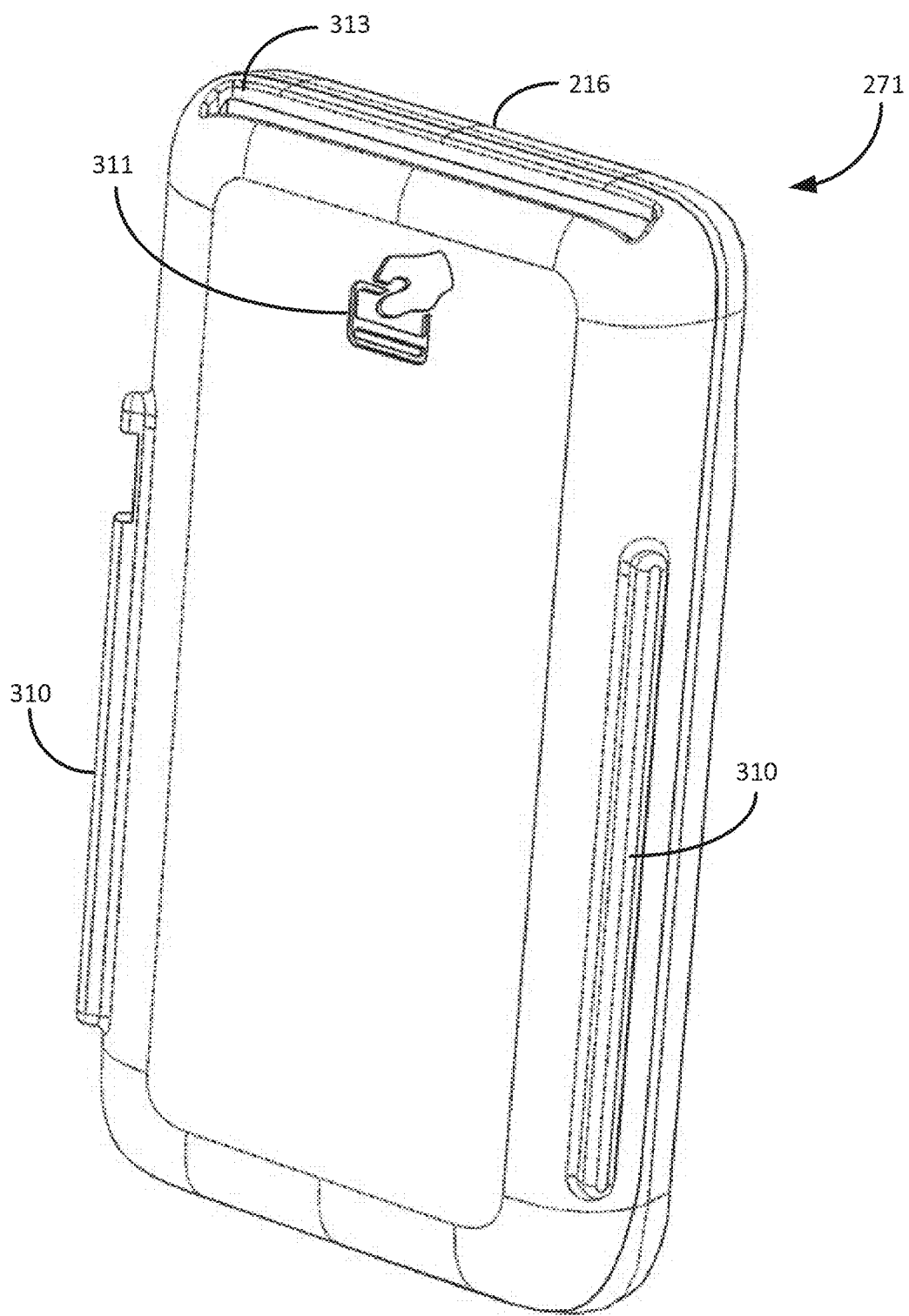
FIG. 18 is a rear perspective view of the case frame for the digital device.

FIG. 18 shows the case frame 271 in more detail. The case frame 271 is typically configured to fit the digital device 216 closely, and to retain the functionality of the controls, ports, etc. of the digital device 216. The case frame 271 has a pair of rails 310 positioned to engage with the grooves 193 in the channel 280. In the illustrated implementation, the case frame 271 has indicia 311 (FIG. 18), preferably molded therein, that identifies instructions for use, such as a swipe direction for using a card reader 312 (FIG. 17) of the digital device 216. As shown in FIG. 18, the digital device can also have a chip card slot 313 for receiving debit or credit cards having a chip.

Figure 14:
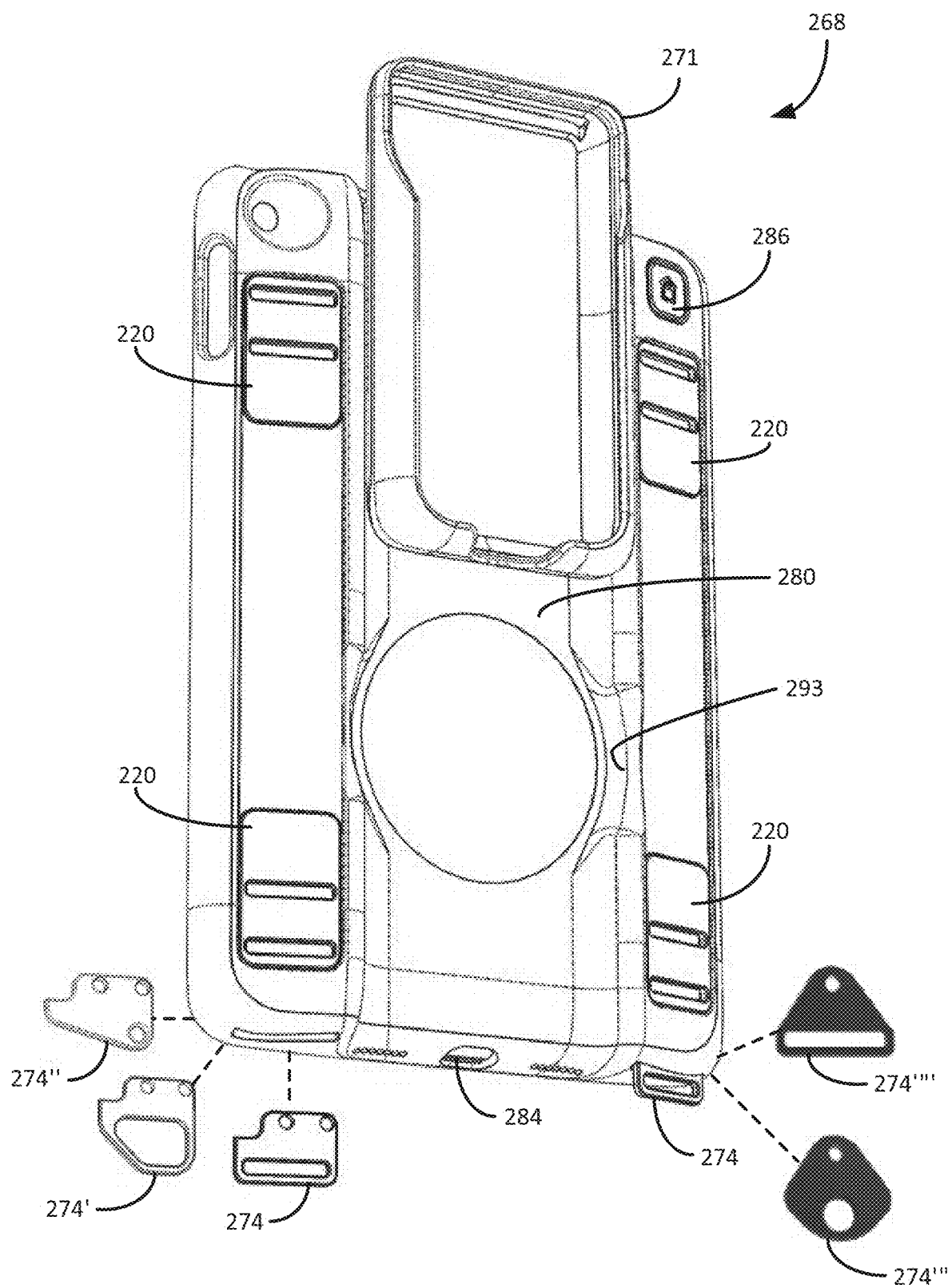
FIG. 14 is a rear perspective view similar to FIG. 12 with the digital device removed.

As shown in FIGS. 11-14, the case 268 includes strap eyelets 274 positioned to receive ends of a shoulder strap or neck strap. In the illustrated implementation, the strap eyelets 274 are configured as separate components so that they can be replaced as necessary and/or removed if no longer desired. The strap eyelets 274 can be attached to an interior 290 of the case 268, such as with fasteners (not shown). As shown in FIG. 14, alternative strap eyelets 274', 274" and 274'" having different peripheral shapes and openings of different shapes can also be provided.

As best shown in FIG. 13, the interior 290 of the case 268 has a center panel 294 in which a magnet area 296 is defined. The magnet area 296 can include one or more magnet recesses or pockets 298. In the illustrated implementation, there are four magnet pockets 298 including two pockets 302 sized for larger magnets interspersed with two pockets 304 sized for smaller magnets. In the illustrated implementation, the magnet area 296 has a generally circular shape. Thus, magnets can be mounted to the inside of the case 268, which allows for the exterior surface of the case 268 to be uninterrupted, resulting in a more durable case 268 that is easier to keep clean and has a more finished appearance.

Referring to FIGS. 12 and 14, the exterior of the case 268 has a mounting recess 293 within the channel 280. The mounting recess 293 is positioned opposite the magnet area 296 and shaped to guide the case 268 into contact with a mount. The mounting recess 293 (sometimes referred to as a channel) helps a user guide the case 268 into contact with a mount, e.g., the mount 140 on the stand 100.

Figure 19:
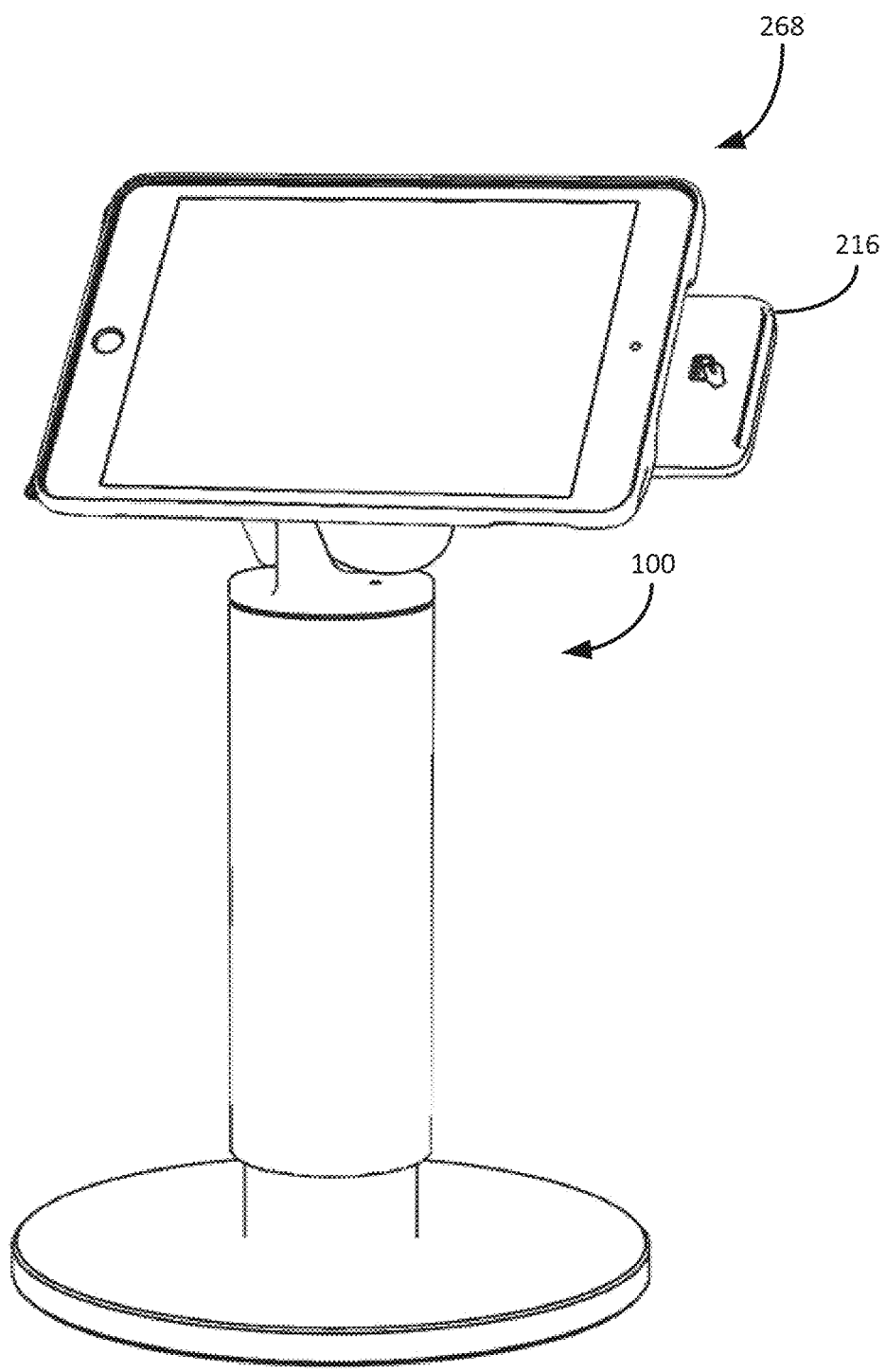
FIG. 19 is a perspective view from a front side showing the case of FIG. 11 mounted to the stand.
Figure 20:
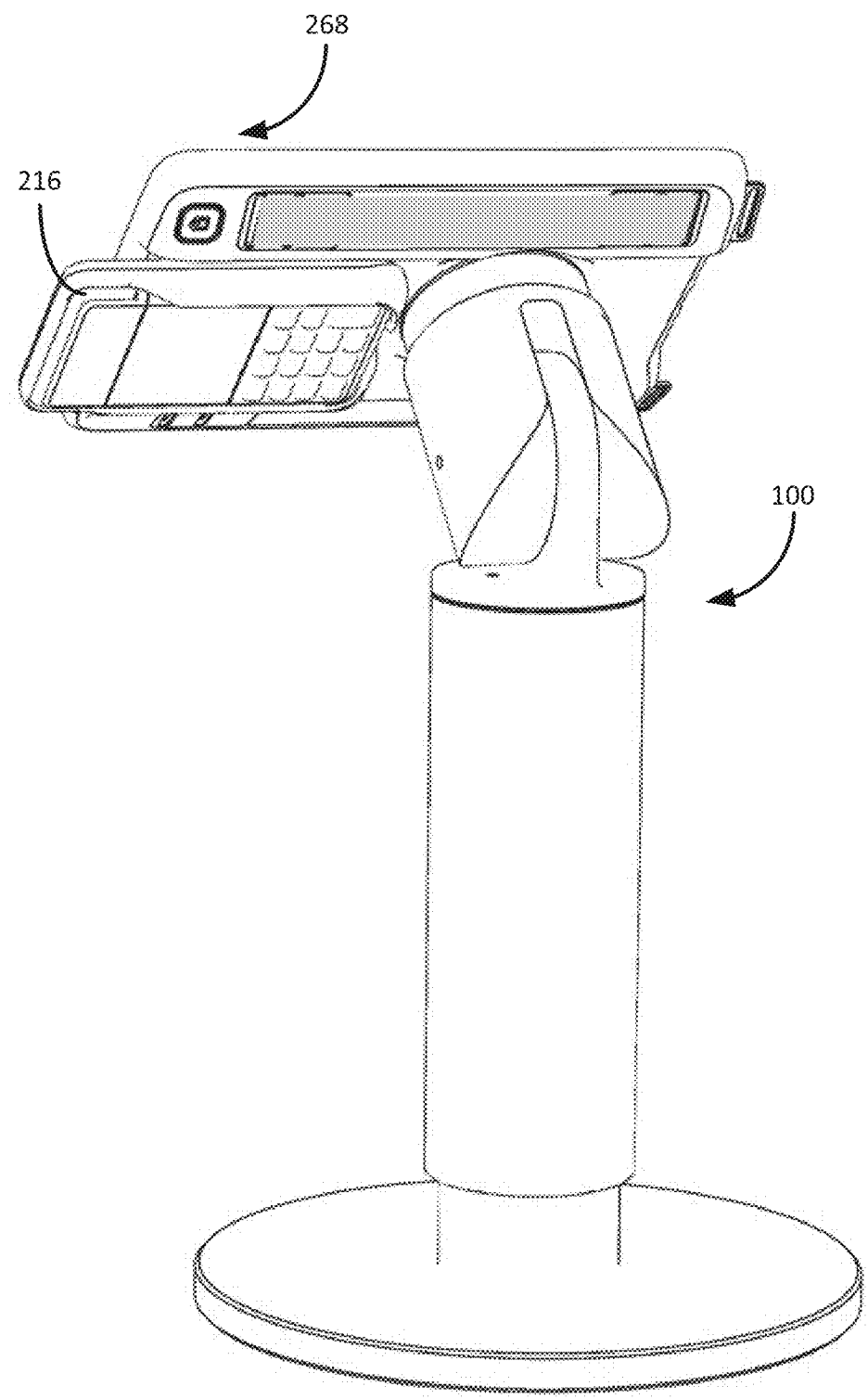
FIG. 20 is similar to FIG. 19 but shows the case mounted to the stand from a rear side.

FIGS. 19 and 20 show the case 268 mounted to the stand 100 and configured for viewing the mobile device 162 within the case 268 in a landscape mode. As also shown, the digital device 216 protrudes beyond the case 268 by a predetermined distance to allow it to be easily seen and accessed by a user. FIG. 19 is a front view of the case 268 as mounted, which is the typical view seen by a user such as a customer service agent. FIG. 20 is a rear view of the case 268 as mounted, which is the typical view seen by a customer addressing the customer service agent on the other side of the stand.

As described elsewhere, the magnetic mounting between the case 268 and the stand 110 can be configured to such that a standard orientation (e.g., a portrait orientation or a landscape orientation) of the case 268 is preferred or required, such as by providing a stronger magnetic attractive force towards those orientations compared to other orientations. In this way, when a user positions the case 268 within range of the stand 100 for mounting, the magnetic attraction between the magnet members in the case 268 and the magnetic components in the stand 100 tends to attract the case 268 into contact with the stand 100 and to rotate it into a predetermined orientation. In some implementations, the only possible orientations of the case 268 are the portrait orientation and the landscape orientation. In other implementations, other intermediate orientations are also possible.

FIGS. 19 and 20 illustrate a mode of use in which no imaging target is used. As described above, however, important modes of use involve use of an imaging target positioned at a predetermined position relative to the imaging device of the mobile device 162 in the case 268. The imaging target can have any suitable shape (such as the spherical shape described above, a point shape, a rectangular solid shape and/or a shape having at least some flat portion to assist users in confirming positively that contact between a device and the target has been made).

Figure 15:
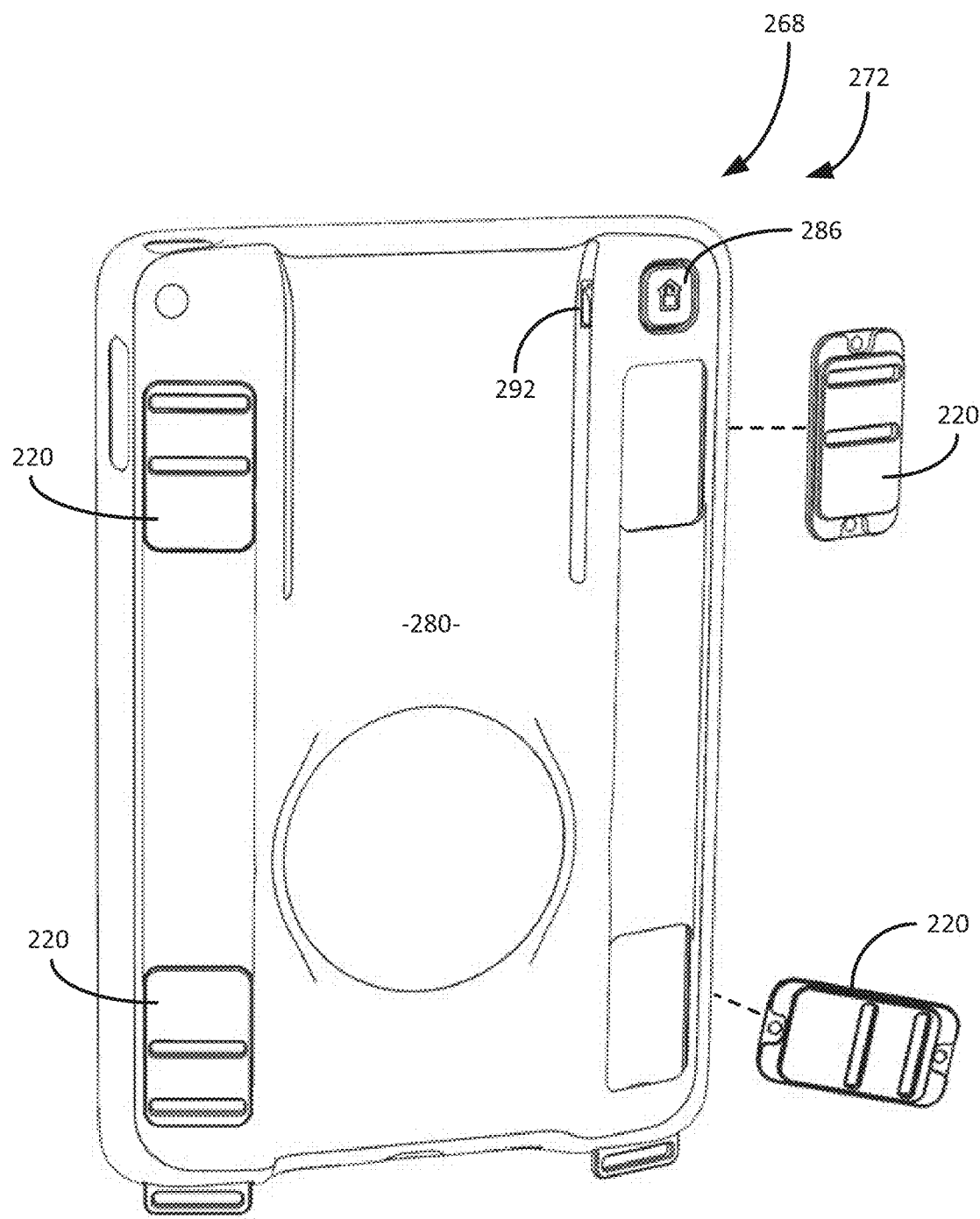
FIG. 15 is a rear perspective view similar to FIG. 14 with a case frame for the digital device removed.
Figure 16:
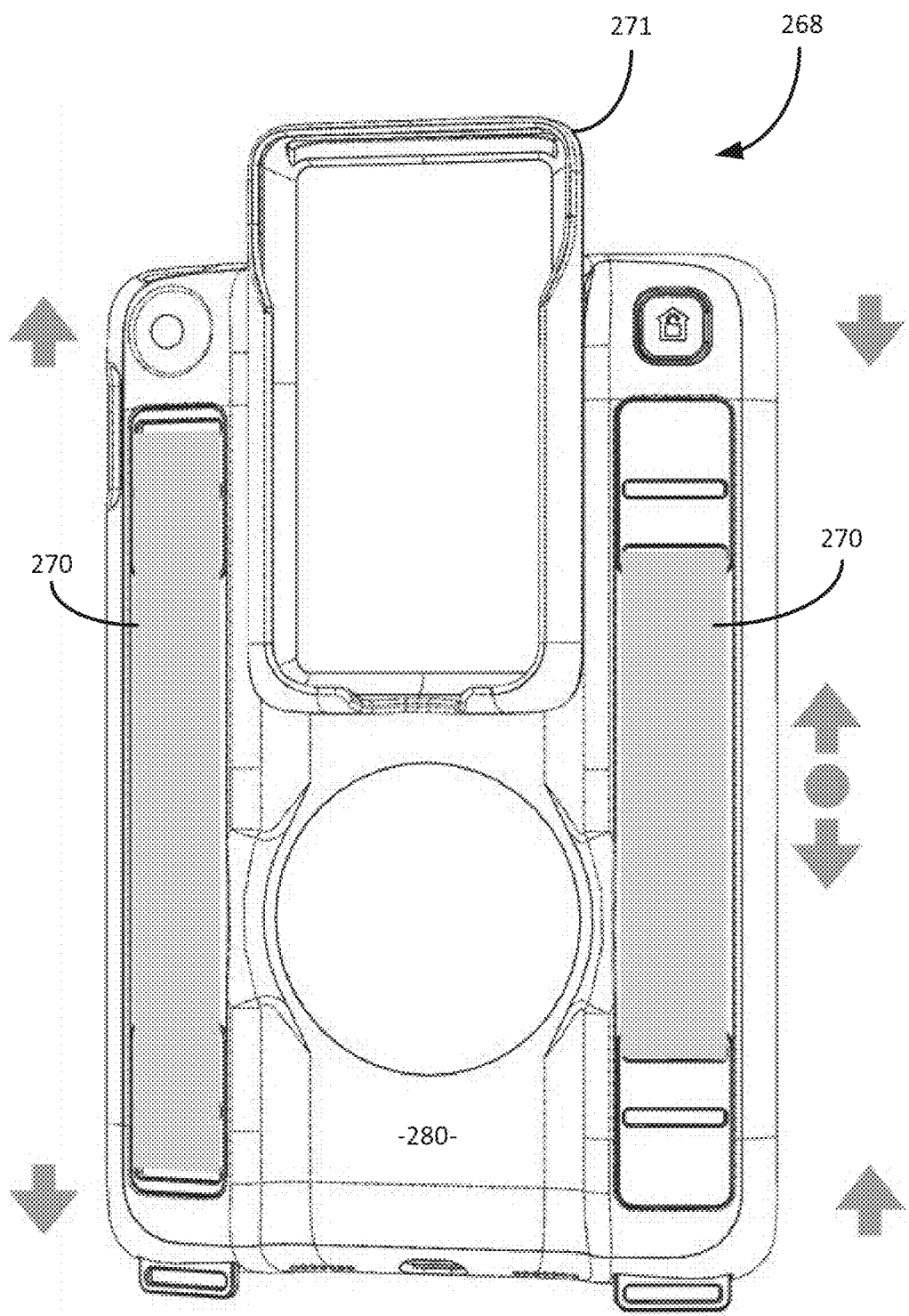
FIG. 16 is a rear perspective view similar to FIG. 14 and showing hand loops adjusted for different lengths.

Referring to FIGS. 12 and 16, the case 268 has one or more hand loops 270, such as the pair of hand loops 270 as shown. As shown in FIGS. 13-16, each of the hand loops 270 is secured to the case 268 with cleats 220 that are attached to the case 268 (e.g., with fasteners). Each of the cleats 220 has two slots through which one end of the hand loop 270 strap material is looped. The looped strap material can be sewn or bonded together, if desired, to retain the hand loop 270 within the cleat 220.

Referring to FIG. 16, in some implementations, an effective size of each hand loop 270 can be optionally varied by changing the orientation of one or both of the cleats 220, as shown in FIG. 15. In FIG. 16, the hand loop 270 shown at the left side of the figure is configured for a longer length, and the hand loop 270 shown at the right side is configured with the cleats reversed to provide for a shorter length. An intermediate length between the longer length and the shorter length is possible by changing the orientation of only one of the cleats.

Figure 21:
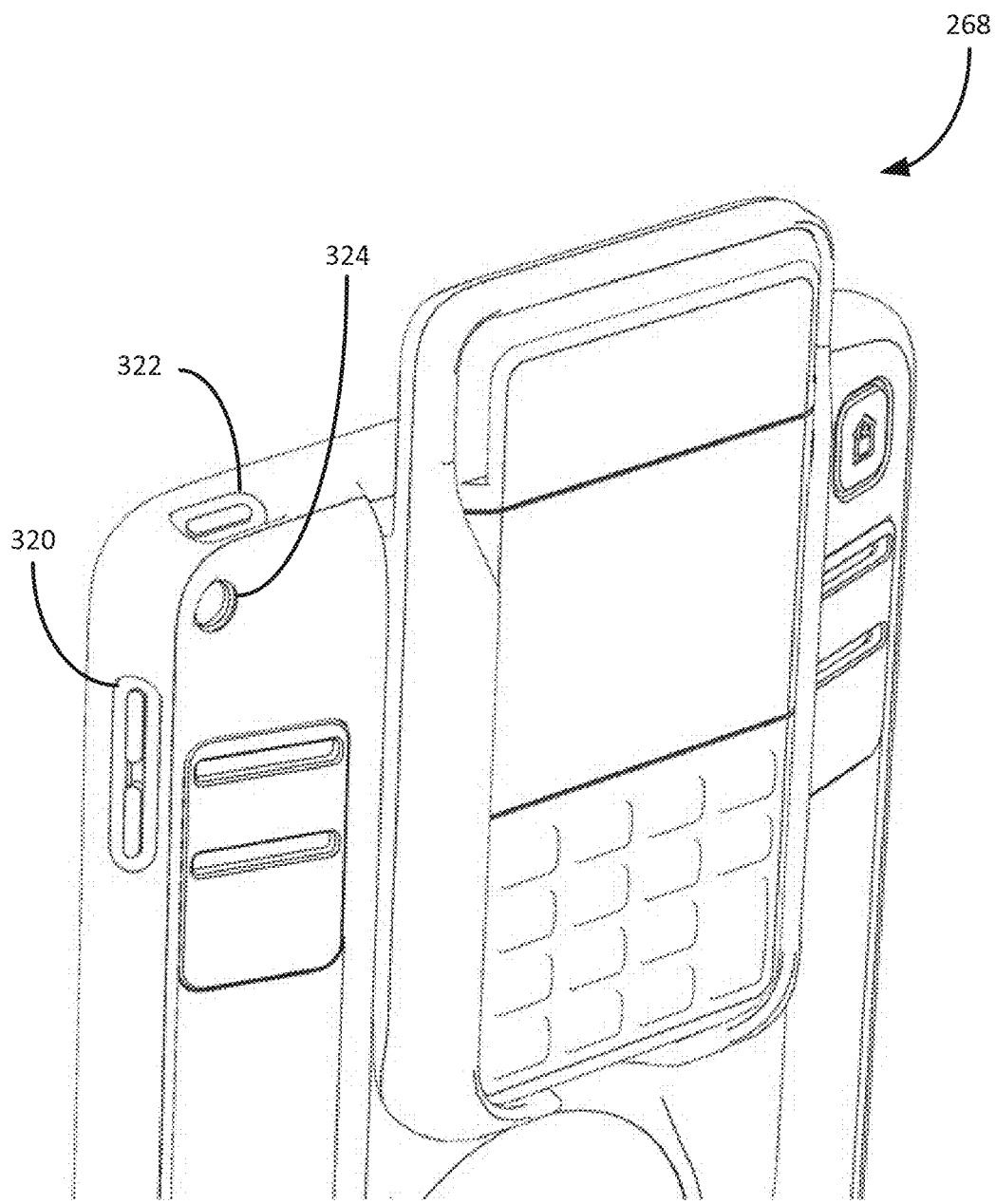
FIG. 21 is an enlarged perspective view of a portion of the case of FIG. 11.
Figure 22:
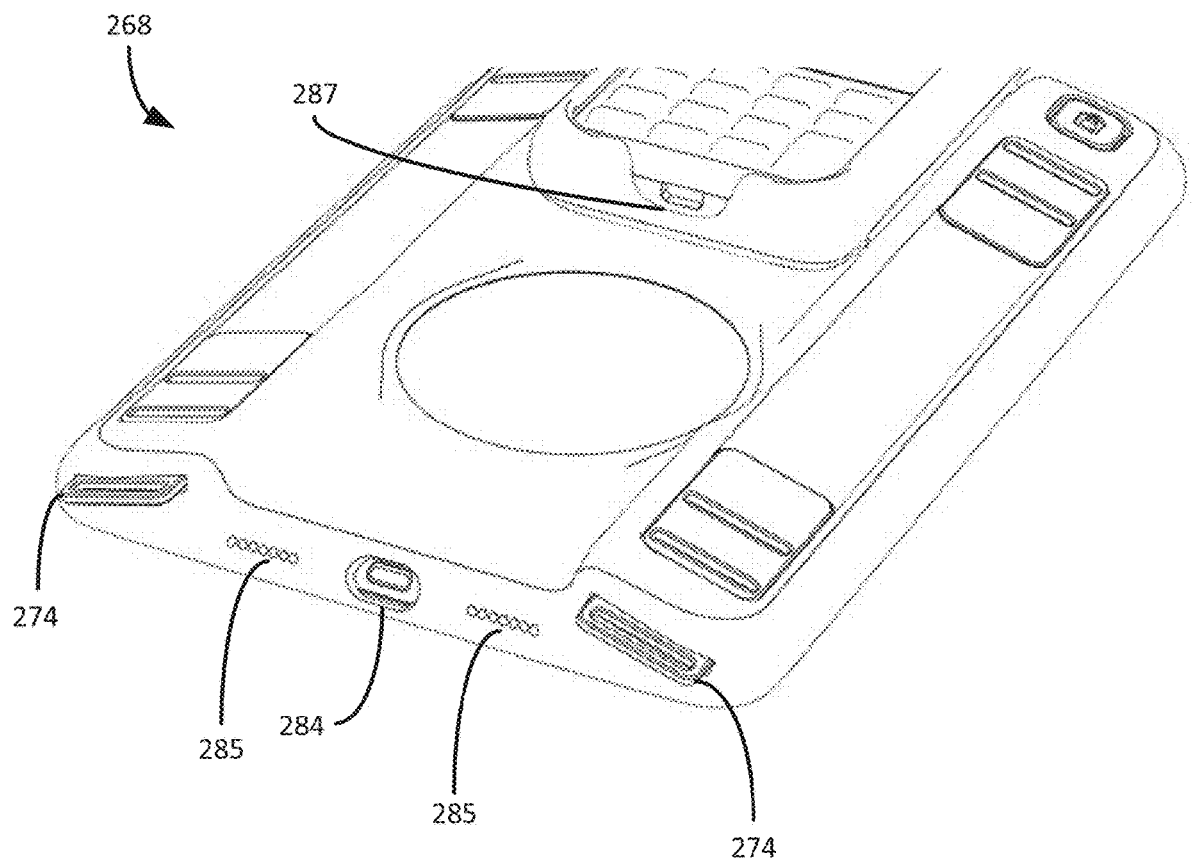
FIG. 22 is another enlarged perspective view of a portion of the case.

FIG. 21 is a partial perspective view showing that the case 268 can be fitted with an opening positioned to allow access to the controls of the mobile device 162, such as a home button, volume controls, on/off button, etc. In FIG. 21, the case 268 is shown as having a side opening 320 for accessing volume controls of the mobile device 162, and on/off button opening 322 and an imaging device opening 324 that allows use of the imaging device without substantial interference from the case 268. As shown in FIG. 22, the case 268 can be provided with a charging port opening 284 and speaker venting 285. As also shown in FIG. 22, the case frame 271 can be constructed to provide similar access, such as with a charge port opening 287.

As also shown in FIG. 22, the case 268 is preferably configured to have a cross section that is suited for holding in one or both hands. The case 268 has edges with a rounded profile and a cross section that generally increases in dimension from the edges towards the center (see also FIGS. 23D and 23E). Thus, the areas of the case 268 adjacent the hand loops 270 have a larger dimension that is comfortable for holding, particularly with one hand.

FIGS. 23A-23F are front elevation, left side elevation, right side elevation, top plan, bottom plan and read side elevation views of the case 268.

The case 268 and the case frame 271 can be formed of any suitable material(s), including a rigid plastic that provides sufficient strength in a minimal thickness that allows a suitable form factor to be achieved. The case 268 can also include sections that are co-molded with rubber to form a protective surround. The loops 274 and the cleats 220 can be formed of metal or another suitable material.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A stand for positioning a mobile device, comprising:
   a mount configured to receive a mobile device;
   a height-adjustable upright member coupled to the mount and adjustable to position the mount within a desired height range for users;
   a lateral member coupled to the upright member; and
   an imaging target supported by the lateral member and positionable within an imaging range of a mobile device when received in the mount, the lateral member being at least partially resilient to permit predetermined movement of at least the imaging target upon contact with an article being positioned for imaging.

2. The stand of claim 1, wherein the imaging target comprises a substantially spherical shape.

3. The stand of claim 1, wherein the lateral member comprises an adjustable lateral member coupler configured to couple the lateral member to the upright member.

4. The stand of claim 1, wherein the stand is swivelable about a vertical axis.

5. The stand of claim 1, wherein the upright member includes a first quick attach mount at an upper end of the upright member configured to receive a second quick attach mount coupled to a carrier for a mobile device.

6. The stand of claim 1, wherein the first quick attach mount comprises a magnet mount.

7. The stand of claim 1, wherein the height-adjustable upright member comprises an inner member and an outer member that are friction fit to each other.

8. The stand of claim 7, wherein at least one of the inner member or the outer member comprises a foam surface configured to increase friction.

* * * * *